United States Patent  
Aoyama et al.

(10) Patent No.: US 10,363,597 B2  
(45) Date of Patent: Jul. 30, 2019

(54) R-θ TABLE APPARATUS AND PROCESSING APPARATUS OF INTERNAL THREAD

(71) Applicant: M. H. CENTER LIMITED, Misato-shi, Saitama (JP)

(72) Inventors: Susumu Aoyama, Misato (JP); Tsuyoshi Aoyama, Misato (JP)

(73) Assignee: M.H. CENTER LIMITED, Misato-shi (JP)

( * ) Notice: Subject to any disclaimer, the term of this patent is extended or adjusted under 35 U.S.C. 154(b) by 624 days.

(21) Appl. No.: 15/028,839

(22) PCT Filed: Jul. 30, 2014

(86) PCT No.: PCT/JP2014/004010
§ 371 (c)(1),
(2) Date: Apr. 12, 2016

(87) PCT Pub. No.: WO2015/056375
PCT Pub. Date: Apr. 23, 2015

(65) Prior Publication Data
US 2016/0256915 A1    Sep. 8, 2016

(30) Foreign Application Priority Data

Oct. 17, 2013  (JP) ................. 2013-216072
Apr. 17, 2014  (JP) ................. 2014-085580

(51) Int. Cl.
*B21H 3/08*  (2006.01)
*B23G 7/00*  (2006.01)
(Continued)

(52) U.S. Cl.
CPC ............. *B21H 3/08* (2013.01); *B21H 5/025* (2013.01); *B23G 1/02* (2013.01); *B23G 7/00* (2013.01);
(Continued)

(58) Field of Classification Search
CPC .. B25B 11/00; B25B 1/00; B23G 1/34; B21H 5/025; B21H 3/08
(Continued)

(56) References Cited

U.S. PATENT DOCUMENTS 5,076,744 A     12/1991 Kitagawa et al.
2006/0144111 A1*  7/2006 Aoyama ............... B21H 5/025
                                                        72/91

FOREIGN PATENT DOCUMENTS

EP    1 621 269 A1    2/2006
FR    2 478 768 A1    9/1981
(Continued)

OTHER PUBLICATIONS

Nov. 4, 2014 Search Report issued in International Patent Application No. PCT/JP2014/004010.
(Continued)

*Primary Examiner* — Pradeep C Battula
(74) *Attorney, Agent, or Firm* — Oliff PLC

(57) ABSTRACT

There is provided an R-θ table apparatus which freely movies one table on a plane in the forward-and-rearward and leftward-and-rightward directions and in the rotational direction. The R-θ table apparatus changes a horizontal distance between a center line of a main axis of a driving apparatus and the action point by elevating an elevating base, and a table is moved to an arbitrary position without rotating along a guide member.

5 Claims, 21 Drawing Sheets

(51) Int. Cl.
*F02D 15/02* (2006.01)
*F16H 21/20* (2006.01)
*F04B 9/04* (2006.01)
*F01B 1/06* (2006.01)
*F04B 53/00* (2006.01)
*B23G 1/02* (2006.01)
*F01B 29/12* (2006.01)
*F01B 31/26* (2006.01)
*F02B 75/04* (2006.01)
*F04B 49/12* (2006.01)
*B21H 5/02* (2006.01)

(52) U.S. Cl.
CPC ............ *F01B 1/0686* (2013.01); *F01B 29/12* (2013.01); *F01B 31/26* (2013.01); *F02B 75/047* (2013.01); *F02D 15/02* (2013.01); *F04B 9/04* (2013.01); *F04B 49/125* (2013.01); *F04B 53/006* (2013.01); *F16H 21/20* (2013.01)

(58) Field of Classification Search
USPC ........................ 29/281.1; 269/903, 73, 71, 55
See application file for complete search history.

(56) References Cited

FOREIGN PATENT DOCUMENTS

| | | |
|---|---|---|
| GB | 2 262 250 A | 6/1993 |
| JP | S32-10738 B | 12/1957 |
| JP | S46-20133 Y | 7/1971 |
| JP | S56-55751 A | 5/1981 |
| JP | H03-117516 A | 5/1991 |
| JP | 2005-302838 A | 10/2005 |
| JP | 2012-030349 A | 2/2012 |

OTHER PUBLICATIONS

Oct. 21, 2014 Office Action issued in Japanese Patent Application No. 2014-180171.
Feb. 17, 2015 Office Action issued in Japanese Patent Application No. 2014-180171.
Jun. 20, 2017 Search Report issued in European Patent Application No. 14853290.6.
Mar. 8, 2017 Office Action issued in Canadian Patent Application No. 2,927,894.
Apr. 28, 2016 International Preliminary Report on Patentability issued in International Patent Application No. PCT/JP2014/004010.

* cited by examiner

R-θ TABLE APPARATUS AND PROCESSING APPARATUS OF INTERNAL THREAD

CROSS-REFERENCE TO RELATED APPLICATION

This application is a U S. National Stage application claiming the benefit of prior filed International Application Number PCT/JP2014/004010 filed Jul. 30, 2014, in which the International Application claims the priorities from Japanese Patent Application Nos. 2013-216072, filed on Oct. 17, 2013, and 2014-085580, filed on Apr. 17, 2014, the entire contents of which are incorporated herein by reference.

TECHNICAL FIELD

The present invention relates to an R-θ table apparatus which freely moves one table on a plane without rotating in the forward-and-rearward and leftward-and-rightward directions and in the rotational direction.

The present invention relates to an apparatus which processes an internal thread in a hole of a metal material having a hole for internal thread processing by using the R-θ table apparatus.

The present invention relates to a variable crank apparatus which can change the amplitude of a connection rod from 0 to a certain set value freely and smoothly and at high rigidity by a controlled external force by rotation of a crank axis.

BACKGROUND ART

In the related art, in a machine tool, a press molding machine, a transfer machine, or an industrial robot, in order to position a workpiece in the X-axis and in the Y-axis direction, an electric or a hydraulic X-Y table which moves on a plane is used (for example, refer to Patent Document 1).

This type of X-Y table includes an X-axis table which has a guide groove in the X-axis direction, and becomes a base of the X-Y table; a Y-axis table (that is, moving table) which is provided to be movable on the X-axis table, and has a guide groove in the Y-axis direction; an X-axis actuator which is provided on the X-axis table, and slidably displaces the Y-axis table in the X-axis direction; and a Y-axis actuator which slidably displaces the Y-axis table in the Y-axis direction.

In addition, as the X-axis and Y-axis actuators, a rotary type actuator in which an electric servo motor or a hydraulic motor and a ball thread are combined, or an actuator in which a reciprocating hydraulic cylinder is used, is used.

In the X-Y table configured in this manner, the movement in the X-axis direction operates the X-axis actuator and integrally moves the Y-axis table and a Y-axis movable mechanism, and the movement in the Y-axis direction operates the Y-axis actuator, moves the Y-axis table (that is, moving table), and can position the Y-axis table at a predetermined position.

Meanwhile, as is well known, an internal thread configures one side of a thread which is the most typical fastening element.

In the related art, it is known that the internal thread is processed by tapping processing.

However, in general, the processing of the internal thread having a relatively large diameter is not performed in the tapping processing.

As a processing method of the internal thread having a relatively large diameter, cutting processing by a single point tool (threading cutting tool) is mainly employed (for example, refer to Patent Document 2).

However, although the cutting processing by the single point tool (threading cutting tool) has a problem, such as a damage of a tool blade tip due to processing of generated chips and generation of the chips, there was not an alternative processing method.

In addition, as an internal thread cutting method, for example, a method of pressing a thread cutter which is called a chaser against a surface to be cut of a tube body, and moving the tube body forward and rearward in the axial direction of the tube while rotating the tube body, is employed.

In addition, for the internal thread which is desired for the single point tool (threading cutting tool) and for the tapping, it is necessary to relatively move only by a pitch of the thread per one relative rotation in the axial direction of the internal thread. Therefore, controllable parts increase, and as a result, it was not possible to design a processing machine which has high strength and rigidity.

In addition, since the rotation of the tool corresponding to the number of screw threads is necessary (for example, refer to Patent Document 2), the processing time itself is limited.

Patent Document 1: Japanese Unexamined Patent Application Publication No. 2005-302838

Patent Document 2: Japanese Unexamined Patent Application Publication No. 2012-30349

DISCLOSURE

Problems to be Solved

First, in the X-Y table in the related art, since it is necessary to load the entire Y-axis movable mechanism on a base which moves on the X-axis, there is a problem that a double layer is generated, the number of configuration components increases, and rigidity deteriorates.

Furthermore, in the X-Y table in the related art, when moving the Y-axis table in the X-axis direction, in order to move the entire Y-axis table to a target position, it is necessary for the X-axis actuator to move the entire Y-axis table and the Y-axis actuator provided on the Y-axis table, and a great force is necessary.

In addition, since the inertia weight when moving in the X-axis direction is large, it is not possible to perform control at a high speed and with high accuracy.

Furthermore, since the Y-axis actuator relatively moves with respect to the base (X-axis table), wiring or piping which is linked to the Y-axis actuator moves on the base (X-axis table) together with the Y-axis actuator, the wiring or the piping is damaged due to fatigue, and there is a problem in durability.

In addition, when driving resisting external pressure in the radial direction in a spiral shape and in a circular movement, there is a problem that a vector of the external force is inverted while any of the X-axis and the Y-axis is an arc reciprocating motion, and vibration and abnormal trajectory are generated due to a temporary backlash.

Next, as the internal thread processing, a thread processing method which does not generate chips similar to a tap without a groove that shows an effect in a thread having a relatively small diameter is considered to be applied to the thread having a relatively large diameter in which the tap without a groove is not generally employed.

However, a radial load which is necessary for an external thread shaped tool changes according to a condition caused by the effective length of a desired internal thread, hardness of a material, or the diameter of the external thread shaped tool. Therefore, it is necessary that the radial load which is necessary for the external thread shaped tool is at least 10 times or more compared to processing for cutting processing by the single point tool (threading cutting tool).

Furthermore, the external thread shaped tool is similar to an NC milling machine in which the rotation of a main axis is stopped for moving performance, but the radial load (for example, equal to or greater than 50 kNf) of the main axis which is much greater than the radial load of the main axis that is allowed for a normal milling machine, is necessary.

In this manner, there was not a machine in which the radial load of the main axis is equal to or greater than 50 kNf.

Therefore, by using the processing method and the apparatus in the related art, it was not possible to employ the thread processing method in which the chips are not generated to the thread having a relatively large diameter in which the tap without a groove is generally not employed.

Meanwhile, a crank mechanism which engages the rotation movement and the reciprocating movement, also called locomotion, is a typical mechanism, such as a steam engine, and is a mechanism which is fundamental in a reciprocating engine of a vehicle or a crank press, even today.

However, a defect of the crank mechanism is that the movement amplitude of a crankpin with respect to the rotation of the crank axis and a connection rod which is engaged with the crankpin, is determined by the distance between the connection rod and the crankpin disposed parallel to the crank axis, and the movement amplitude cannot be changed in the mechanism itself. For example, the crank press is a representative example which maintains a constant stroke with high rigidity regardless of the load, and similar to a definition of JISB0111-4037 or the like, in order to make the stroke variable, a second eccentric part for adjustment is interposed between the crankpin and the connection rod while eccentricity of a main crank is fixed, and by using this, an apparent stroke is changed.

In this case, a phase change in a peak and a bottom of a piston as the second eccentric part rotates to a rotation phase of the crank axis is inevitable. Therefore, by interposing the second eccentric part for adjustment, the use of the mechanism is restricted, and the mechanism is not widely distributed.

In order to solve the problems in the related art, a proposition of the present invention is to provide an R-θ table apparatus which freely moves one table on a plane without rotating in the forward-and-rearward and leftward-and-rightward directions and in the rotational direction.

In addition, another proposition of the present invention is to provide an apparatus which processes an internal thread in a hole of a metal material having a hole for internal thread processing by using the R-θ table apparatus.

In addition, still another proposition of the present invention is to provide a variable crank apparatus which can change the amplitude of a connection rod from 0 to a certain set value freely and smoothly and at high rigidity by a controlled external force by rotation of a crank axis.

Means for Solving the Problems

An R-θ table apparatus according to the present invention includes: a table which is provided with a through hole having a bearing; a guide member which holds the table to be horizontally freely movable; a driving apparatus which is provided with an action axis inserted being inclined to the bearing, and drives the action axis to be freely rotated and stopped; an elevating base which elevates the driving apparatus; an elevating apparatus which elevates the elevating base, and changes a position of an action point at which the action axis and the bearing are engaged with each other; and a base which is provided with a post that guides the elevating base and the guide member, and mounts the elevating apparatus, and a horizontal distance between a center line of a main axis of the driving apparatus and the action point can be changed by elevating the elevating base, and the table can be moved to an arbitrary position without rotating along the guide member.

In the present invention, the table is provided with a plurality of through holes provided with the bearing, each of the action axes is inserted into each of the through holes, and each of the action axes is synchronously operated.

In the present invention, the bearing is a spherical bearing.

In the present invention, the driving apparatus and the elevating apparatus are a servo motor or a stepping motor.

A processing apparatus of an internal thread according to the present invention includes: the R-θ table apparatus according to the present invention; an external thread shaped tool which is fixed and loaded onto the table of the R-θ table apparatus; and a support member which is fixed onto the base of the R-θ table apparatus, and grips or fixes a metal material having a hole for internal thread processing, and a thread groove can be formed by transferring a shape of a processing portion while the external thread shaped tool fixed onto the table consecutively presses the processing portion of the external thread shaped tool to an inner circumference of the hole only with a revolving motion on a constant horizontal surface without rotating.

In the present invention, it is necessary that the external thread shaped tool for molding a desired internal thread by transferring, has the pitch length which is the same as that of the desired internal thread. However, since the thread diameter of the external thread shaped tool is smaller than the thread diameter of the desired internal thread, a torsional angle which makes a screw thread is greater than that of the internal thread. For example, when the diameter of the external thread shaped tool is half of the diameter of the internal thread, the torsional angle thereof is substantially two times greater. In order to bridge the gap and to mold the pitch of the internal thread which is the same as that of the external thread shaped tool, it is necessary to ensure constant slidability all the time in a contact portion, that is, to achieve robust synchronization which does not cause rotation.

In order to eliminate the above-described torsional angle gap, as a result, means employed in the present invention firmly maintains the synchronization. When the difference between the diameters of the internal thread and the external thread shaped tool is large, the external thread shaped tool is disengaged from the internal thread which has already been processed, and interference of the molded internal thread is small. Theoretically, generation of a problem is not remarkable, but practically, generation of inclination due to bending of the external thread shaped tool becomes remarkable, and this causes a weakness in transfer molding of the internal thread having excellent accuracy.

When the difference between the diameters of the internal thread and the external thread shaped tool is small, generation of the inclination of the external thread shaped tool is reduced. However, a revolving angle until the engagement of the internal thread and the external thread shaped tool is released becomes large, and the distance of interference and engagement between the internal thread and the external thread shaped tool becomes long. Therefore, resistance of the revolution of the external thread shaped tool increases. Regardless of the resistance, in order to ensure smooth revolution without a slip-stick phenomenon, the only solution is to improve the rigidity of the processing machine.

Based on such a situation, the R-θ table apparatus according to the present invention is configured to change the distance between the main axis and the action point by changing the position of the bearing in the axial direction which includes the action axis that is inclined with respect to the main axis, as a mechanism that changes the stroke linearly, so that operating a program at high rigidity is possible with respect to the external force.

In addition, the spherical bearing which follows a change in angle is provided for cancelling the inclination between the inclined action axis and the table, and the table is horizontally maintained at all times.

A variable crank apparatus according to the present invention includes: an inclined crankpin which is inclined with respect to a center line of a main axis, and is connected to the main axis; a body to be moved in which a bearing which inserts the inclined crankpin is provided in a through hole; a guide apparatus which holds the body to be moved to be freely movable; and an adjusting apparatus which rotates and moves the inclined crankpin, and stops rotation or stops movement of the inclined crankpin so as to change a position of an action point at which the inclined crankpin and the bearing are engaged with each other, and the distance between the center line of the main axis and the action point is changed by the adjusting apparatus, and the body to be moved is moved along the guide apparatus.

In the present invention, the body to be moved is provided with a plurality of through holes provided with the bearing, each of the inclined crankpins is inserted into each of the through holes, and each of the inclined crankpins is synchronously operated.

In the present invention, the bearing is a spherical bearing.

In the present invention, in the spherical bearing, an insertion portion of the inclined crankpin has an inner circumference which does not interfere with the rotation of the inclined crankpin and the movement in the axial direction of the inclined crankpin.

A pumping apparatus of a variable discharge quantity according to the present invention includes: an inclined crankpin which is inclined with respect to a center line of a main axis, and is connected to the main axis; a connection rod in which a bearing which inserts the inclined crankpin is provided in a through hole; a pumping main body which holds a piston assembled to the connection rod to be freely movable in a cylinder block; and an adjusting apparatus which rotates and moves the inclined crankpin, and stops rotation or stops movement of the inclined crankpin so as to change a position of an action point at which the inclined crankpin and the bearing are engaged with each other, and the distance between the center line of the main axis and the action point is changed by the adjusting apparatus, and the piston which is assembled to the connection rod is moved in the cylinder block.

A pressing apparatus of a variable stroke according to the present invention includes: an inclined crankpin which is inclined with respect to a center line of a main axis, and is connected to the main axis; a connection rod in which a bearing which inserts the inclined crankpin is provided in a through hole; a pressing main body which holds a slide assembled to the connection rod to be freely movable in a mold area; and an adjusting apparatus which rotates and moves the inclined crankpin, and stops rotation or stops movement of the inclined crankpin so as to change a position of an action point at which the inclined crankpin and the bearing are engaged with each other, and the distance between the center line of the main axis and the action point is changed by the adjusting apparatus, and the slide which is assembled to the connection rod is moved in the mold area.

A variable stroke engine according to the present invention includes: an inclined crankpin which is inclined with respect to a center line of a main axis, and is connected to the main axis; a connection rod in which a bearing which inserts the inclined crankpin is provided in a through hole; an engine main body which holds a piston assembled to the connection rod to be freely movable in a cylinder block; and an adjusting apparatus which rotates and moves the inclined crankpin, and stops rotation or stops movement of the inclined crankpin so as to change a position of an action point at which the inclined crankpin and the bearing are engaged with each other, and the distance between the center line of the main axis and the action point is changed by the adjusting apparatus, and the piston which is assembled to the connection rod is moved in the cylinder block.

Effects

According to the present invention, the horizontal distance between the center line of the main axis of the driving apparatus and the action point can be changed by elevating the elevating base, and one table can be moved to the arbitrary position without rotating along the guide member. Therefore, unlike to the X-Y table in the related art, it is not necessary to load the entire Y-axis movable mechanism onto the base which moves on the X-axis.

Due to this, it is possible to solve the problem of the X-Y table in the related art that a double layer is generated, the number of configuration components increases, and the rigidity deteriorates.

In addition, according to the present invention, the horizontal distance between the center line of the main axis of the driving apparatus and the action point at which the action axis and the bearing are engaged with each other, can be changed by elevating the elevating base, and one table can be moved to the arbitrary position without rotating along the guide member. Therefore, it is possible to solve the problem of the X-Y table in the related art that, when the operation is performed resisting the external pressure in the radial direction in a spiral shape and in a circular movement, a vector of the external force is inverted while any of the X-axis and the Y-axis is in the arc reciprocating motion, and vibration and abnormal trajectory are generated due to a temporary backlash.

In the present invention, the tapping processing is not typical, and there is also no case where trouble is caused by processing of chips generated in the cutting processing by a single point tool (threading cutting tool) with respect to the internal thread having a relatively large diameter. In addition, when viewed from a processing principle, it is possible to achieve an advantage of completing the processing within a short period of time so that the external thread shaped tool is represented by a simple movement, that is, simple revolution on a single horizontal surface.

In the present invention, the internal thread processing method which does not generate chips similar to a tap without a groove that shows an effect in a thread having a relatively small diameter can be applied to the thread having a relatively large diameter in which the tap without a groove is not generally employed.

In addition, in the present invention, even when there are obstacles at every key groove provided in an inner diameter portion of a material hole, it is possible to process the internal thread without generating cut chips regardless of this.

The variable crank apparatus according to the present invention can be manufactured at a low cost with a low number of components, and can also be employed in a power transfer apparatus, such as a reciprocating engine when changing an input direction to the piston side without limiting the use to a machine press, a hydraulic pump, or a compressor. Study of an engine in which the stroke of the piston is variable, such as an Atkinson cycle engine, is also actively conducted these days.

DETAILED DESCRIPTION OF THE EMBODIMENTS

Figure 1:
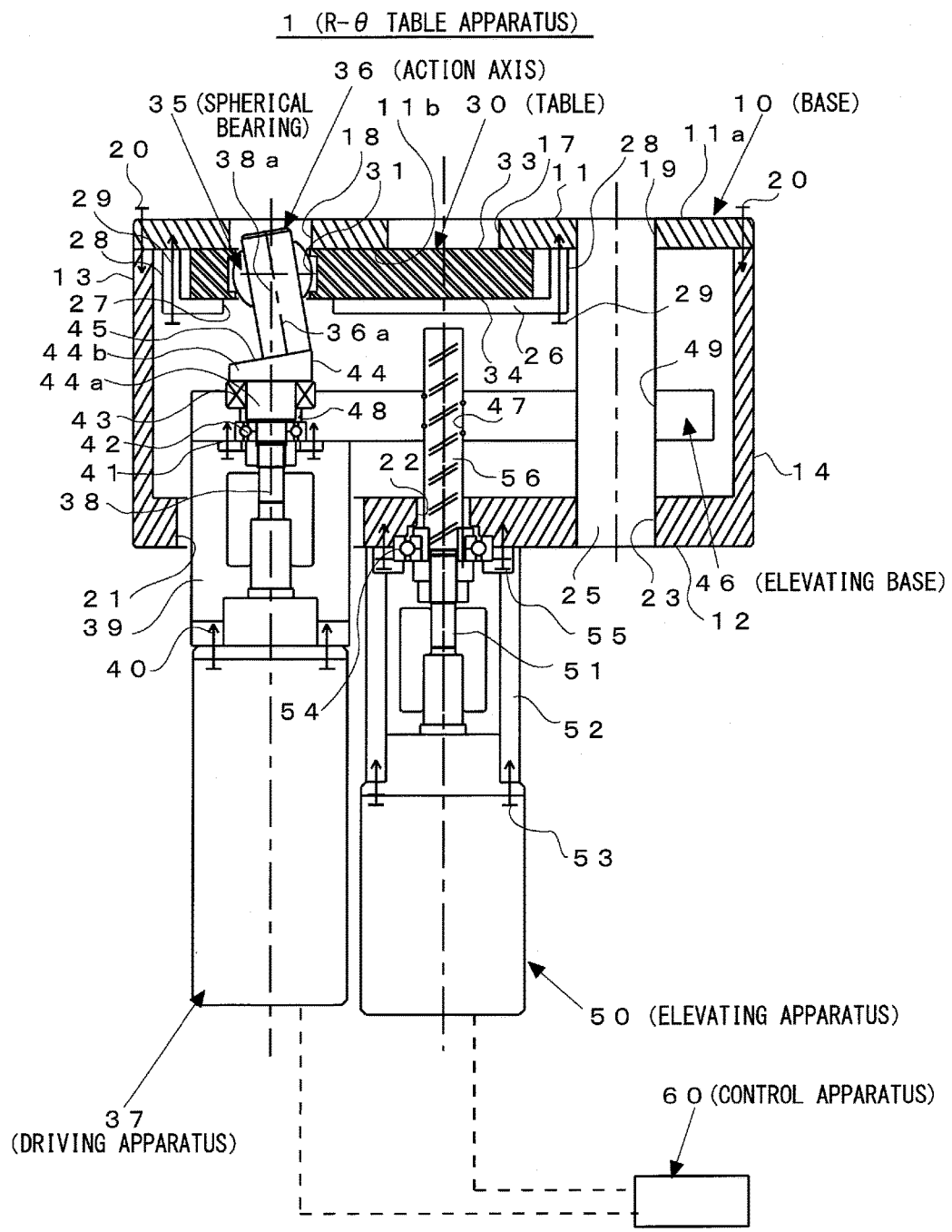
FIG. 1 is a sectional view illustrating a state in which an elevating base of an R-θ table apparatus according to a first embodiment of the present invention is lowered, from a side view.

Hereinafter, the present invention will be described based on embodiments illustrated in the drawings.

First Embodiment

FIGS. 1 to 7 illustrate an R-θ table apparatus 1 according to a first embodiment of the present invention.

The R-θ table apparatus 1 according to the embodiment includes a metal base 10; a metal table 30 which is held to be horizontally freely movable via a guide member 26 on the base 10; a driving apparatus 37 which is provided with an action axis 36 which is inserted being inclined to a spherical bearing 35 provided on the table 30, and drives the action axis 36 to be freely rotated and stopped; a metal elevating base 46 which elevates the driving apparatus 37; and an elevating apparatus 50 which elevates the elevating base 46.

The base 10 configures a fixing base of the R-θ table apparatus 1 which makes a box sectional shape configured of a top plate 11, a bottom plate 12, and side plates 13, 14, 15, and 16.

The top plate 11 includes a substantially circular through hole 17 which can make a tool or the like attached to the table 30 protrude to the outside, and can form a space which is greater than a trajectory of the moving tool or the like when moving and rotating the table 30 in the forward-and-rearward and leftward-and-rightward directions; a substantially circular through hole 18 which can form a space which is greater than the trajectory of the action axis 36 formed when the action axis 36 appears when elevating and/or rotating; and a through hole 19 which supports an upper end portion of a post 25 which will be described later.

In addition, the top plate 11 is fixed to upper surfaces of the side plates 13, 14, 15, and 16 by a plurality of threads 20 to be detachable when assembling and exchanging the table 30, the driving apparatus 37, and the elevating base 46. In addition, an upper surface 11a of the top plate 11 functions as a loading surface to which an object in which processing is performed by the tool or the like attached onto a center point O of the table 30, is attached.

The bottom plate 12 includes a through hole 21 which forms a space which is greater than the outer diameter of the driving apparatus 37, and is vertically moved without abutting against the driving apparatus 37 when elevating the driving apparatus 37; a through hole 22 which forms a space which is greater than the outer diameter of a ball thread 56 attached to a rotation axis 51 of the elevating apparatus 50, and to which the ball thread 56 is inserted; and a through hole 23 which fixes a lower end portion of the post 25 which will be described later.

Between the top plate 11 and the bottom plate 12, two posts 25 are disposed to be respectively point-symmetric to the top plate 11 and the bottom plate 12, the upper end portions of each post 25 are supported by the through hole 19 of the top plate 11, and the lower end portions of each post 25 are adhered in the through hole 23 of the bottom plate 12.

The tray-like guide member 26 which holds the table 30 to be horizontally freely movable in a region other than the through holes 17 and 18 is attached to a rear surface 11b side of the top plate 11 by fixing a side edge portion 28 which stands and is in contact with both side portions by a thread 29. In a region where the action axis 36 of the guide member 26 is inserted, a substantially circular through hole 27 which forms a space which is greater than the trajectory formed when elevating, moving, and rotating the action axis 36, is provided.

The table 30 is provided to make two through holes 31 for inserting the action axis 36 point-symmetric, and the spherical bearing 35 is mounted on each through hole 31. On the table 30, an upper surface 33 is slidable on the rear surface 11b side of the top plate 11, and a lower surface 34 is slidable on the guide member 26. When horizontally moving on the guide member 26 by the action axis 36, the table 30 has a size which does not make the table 30 abut against the side edge portion 28 of the guide member 26, and is processed in a shape which is approximately similar from that of the guide member 26.

The driving apparatus 37 is fixed to an attachment frame 39 via a thread 40, and is fixed to a lower surface of the elevating base 46 via the attachment frame 39 via a thread 41. A main axis 38 of the driving apparatus 37 is inserted into a through hole 48 of the elevating base 46, and is held by a bearing apparatus 42. The driving apparatus 37 is, for example, configured of a servo motor or a stepping motor.

The main axis 38 is linked to a linking body 44 having an inclined surface 45 on an upper surface. The linking body 44 is mounted on the elevating base 46 via a bearing apparatus 43 to be capable of rotating on the elevating base 46. In the linking body 44, for example, an upper surface of a main body 44a which is configured of a columnar body is a columnar body 44b which has the outer diameter that is greater than that of the main body 44a, and the inclined surface 45 is formed on the upper surface of the columnar body 44b.

The action axis 36 is provided on the inclined surface 45 of the linking body 44 to be inclined with respect to a center line 38a of the main axis 38. An inclination angle α which is formed of the center line 38a of the main axis 38 and a center line 36a of the action axis 36, is the same as the inclination of the inclined surface 45. The inclination angle α which is formed of the center line 38a of the main axis 38 and the center line 36a of the action axis 36 influences a function of the spherical bearing 35 which inserts the action axis 36, but for example, the inclination angle may be within a range from an angle (minimum value) which exceeds 0° to the extent that the center line 36a of the action axis 36 does not overlap the center line 38a of the main axis 38, to 30° (maximum value) which is an angle made by the center line 38a of the main axis 38 and the center line 36a of the action axis 36, and it is preferable that the angle is from 3° to 18°. It is desirable that the action axis 36 is configured of a columnar material or a prism material, and the insertion portion of the action axis 36 of the spherical bearing 35 has an inner circumference which does not interfere with the rotation of the action axis 36 and the movement in the axial direction. Therefore, the insertion portion of the action axis 36 of the spherical bearing 35 has a hole shape which corresponds to a sectional shape of the action axis 36.

The elevating base 46 includes a through hole 47 which is provided with a thread groove which meshes with the ball thread 56 attached to the elevating apparatus 50; a through hole 48 which forms a space which is greater than the outer diameter of the main axis 38 of the driving apparatus 37, and to which the main axis 38 of the driving apparatus 37 is inserted; and a through hole 49 to which two posts 25 attached between the top plate 11 and the bottom plate 12 of the base 10 are inserted. The elevating base 46 engages the ball thread 56 attached to the elevating apparatus 50 with the through hole 47 to be freely meshed, and following the driving apparatus 37 by using two posts 25 as guides according to the rotation of the ball thread 56 attached to the elevating apparatus 50, the elevating base 46 is elevated linearly in parallel between the top plate 11 and the bottom plate 12 of the base 10. Since the elevating base 46 is elevated linearly in parallel between the top plate 11 and the bottom plate 12 of base 10 according to the rotation of the ball thread 56 of the driving apparatus 37, it is desirable that the through hole 47 is positioned at an intermediate point of two posts 25.

The elevating apparatus 50 is fixed to an attachment frame 52 via a thread 53, and the attachment frame 52 is adhered to the bottom plate 12 of the base 10 by a thread 55, and is attached to the lower surface of the bottom plate 12. The ball thread 56 attached to the elevating apparatus 50 is mounted to be freely rotatable by a bearing apparatus 54 provided in the through hole 22. In the elevating apparatus 50, for example, the servo motor or the stepping motor is used.

The driving apparatus 37 and the elevating apparatus 50 are configured to be linked to a control apparatus 60, and to control the movement in the forward-and-rearward and leftward-and-rightward directions and in the rotational direction of the action axis 36 with respect to the table 30 by a program embedded in the control apparatus 60. The program can be arbitrarily constructed in accordance with a use method of the R-θ table apparatus 1 according to the embodiment.

Next, an example of assembly of the R-θ table apparatus 1 according to the embodiment configured in this manner, will be described.

First, the base 10 from which the top plate 11 is detached is prepared.

Next, the attachment frame 52 which is fixed to the elevating apparatus 50 by the thread 53 is attached to the lower surface side of the bottom plate 12 of the base 10 via the thread 55.

At this time, the bearing apparatus 54 is mounted on the through hole 22 of the bottom plate 12, and the ball thread 56 which is linked to the rotation axis 51 of the elevating apparatus 50 is inserted via the bearing apparatus 54.

Next, the lower end portions of two posts 25 are respectively fixed to the through hole 23 of the bottom plate 12 of the base 10.

Next, the ball thread 56 and the post 25 are inserted via the through holes 47 and 49 into the elevating base 46 attached to the driving apparatus 37.

At this time, by attaching the attachment frame 39 to the driving apparatus 37 via the thread 40, and by fixing the attachment frame 39 to the lower surface side of the elevating base 46 via the thread 41, the driving apparatus 37 is attached to the elevating base 46. Two groups of bearing apparatuses 42 and 43 are mounted on the through hole 48 of the elevating base 46. The main axis 38 of the driving apparatus 37 is inserted via the bearing apparatus 42, the linking body 44 linked to the main axis 38 supports the main body 44a by the bearing apparatuses 42 and 43, and the columnar body 44b having the inclined surface 45 is mounted on the upper surface side of the elevating base 46. The action axis 36 is attached to the inclined surface 45 being inclined by the inclination angle α.

Next, the top plate 11 on which the table 30 is disposed in the guide member 26 is disposed on an opening portion side of the base 10.

At this time, the action axis 36 is inserted into a through hole 35a of the spherical bearing 35, and two posts 25 are respectively inserted into the through hole 19. After this, the top plate 11 is fixed onto the side plates 13, 14, 15, and 16 of the base 10 via the thread 20.

According to this, the assembly of the R-θ table apparatus 1 according to the embodiment is completed.

Next, the control apparatus 60 lowers the elevating base 46 by driving the elevating apparatus 50 and reversely rotating the ball thread 56, outputs a control signal which moves the elevating base 46 to a stationary position of the table 30 illustrated in FIG. 1, and stops the elevating base 46 at the stationary position of the table 30.

At this time, the control apparatus 60 outputs a control signal which holds the rotation stop of the main axis 38 so as to hold a stationary state of the table 30 with respect to the driving apparatus 37.

According to this, the R-θ table apparatus 1 according to the embodiment holds the table 30 in an initial state where the table 30 can be operated.

First, an operation of the R-θ table apparatus 1 according to the embodiment will be described.

The control apparatus 60 outputs the control signal to the driving apparatus 37 and the elevating apparatus 50 in accordance with a usage target of the table 30, elevates the elevating base 46, and according to this, the control apparatus 60 can horizontally move the table 30 on the guide member 26 without rotating in the forward-and-rearward and leftward-and-rightward directions and in the rotational direction.

Figure 2:
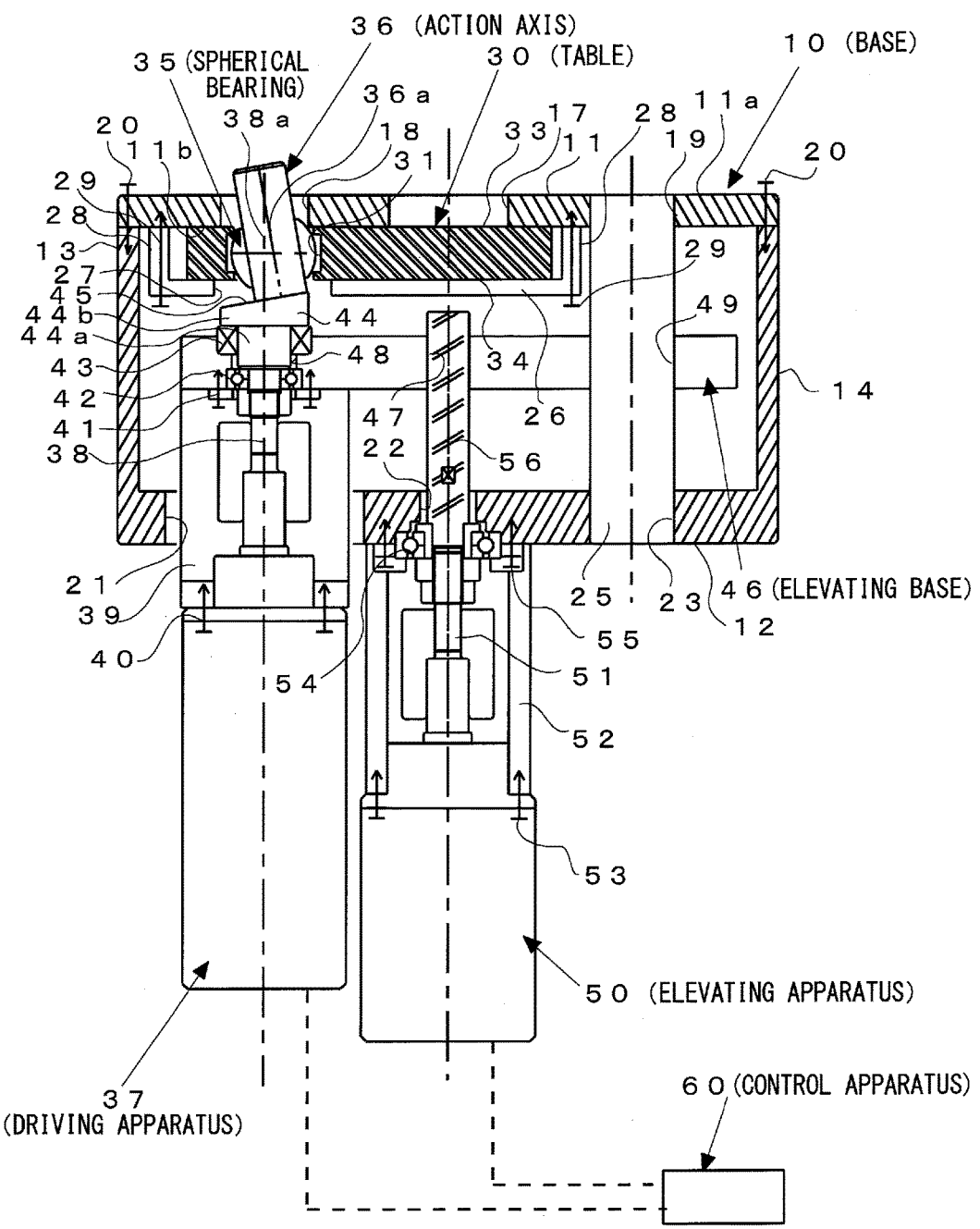
FIG. 2 is a sectional view illustrating a state in which the elevating base of the R-θ table apparatus according to the first embodiment of the present invention is raised, from a side view.
Figure 3:
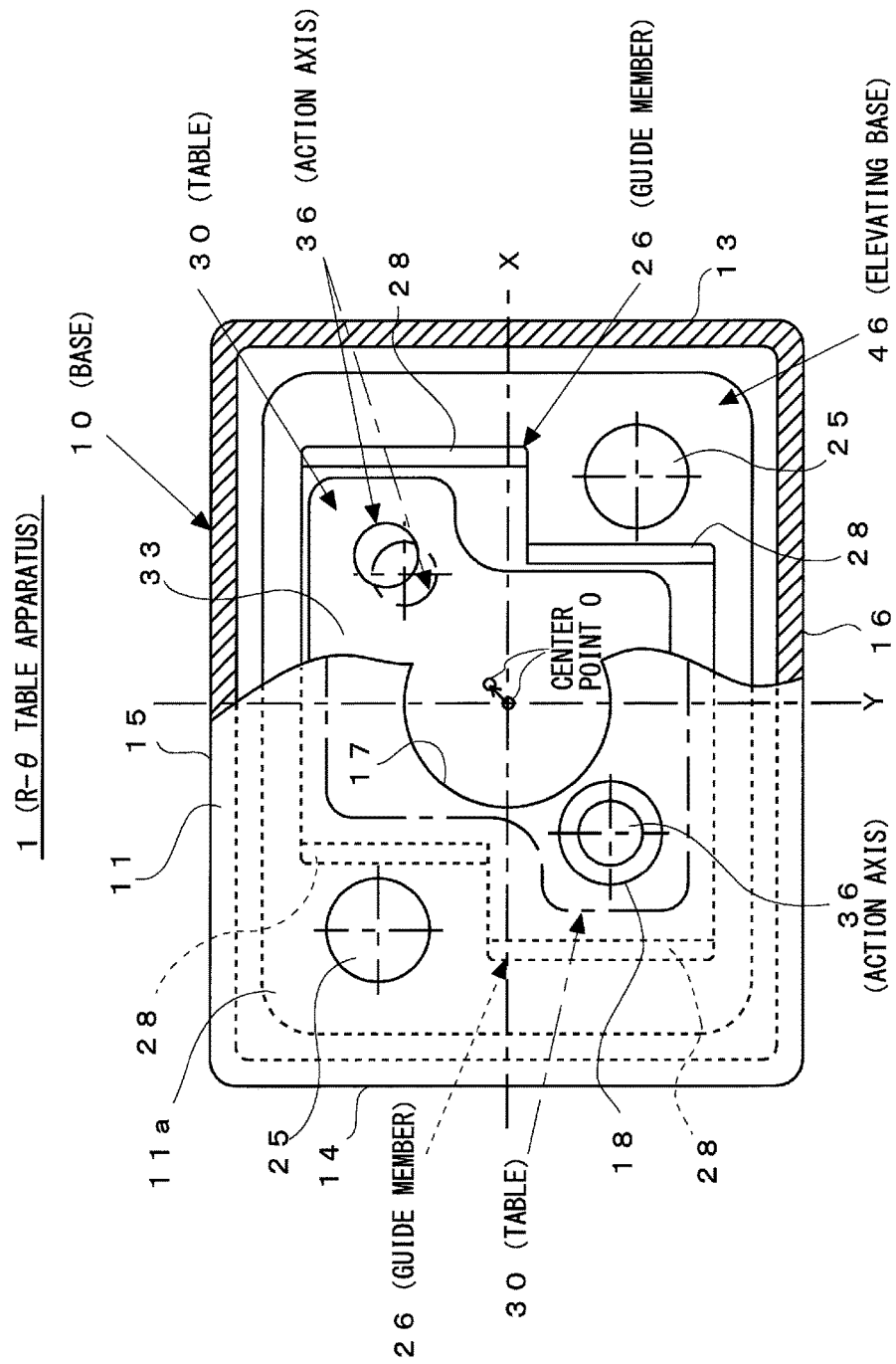
FIG. 3 is a schematic plan view which cuts through and illustrates a part of the R-θ table apparatus according to the first embodiment of the present invention.

For example, when moving the table 30 to a position illustrated by a solid line in FIG. 3 from the stationary state illustrated by one-dot chain line in FIG. 3, the control apparatus 60 outputs the control signal which holds the rotation stop of the main axis 38 to hold the stationary state of the table 30 with respect to the driving apparatus 37, raises the elevating base 46 by rotating the ball thread 56 with respect to the elevating apparatus 50, and outputs the control signal which horizontally moves the table 30 on the guide member 26 to the position illustrated in FIG. 2.

Figure 6:
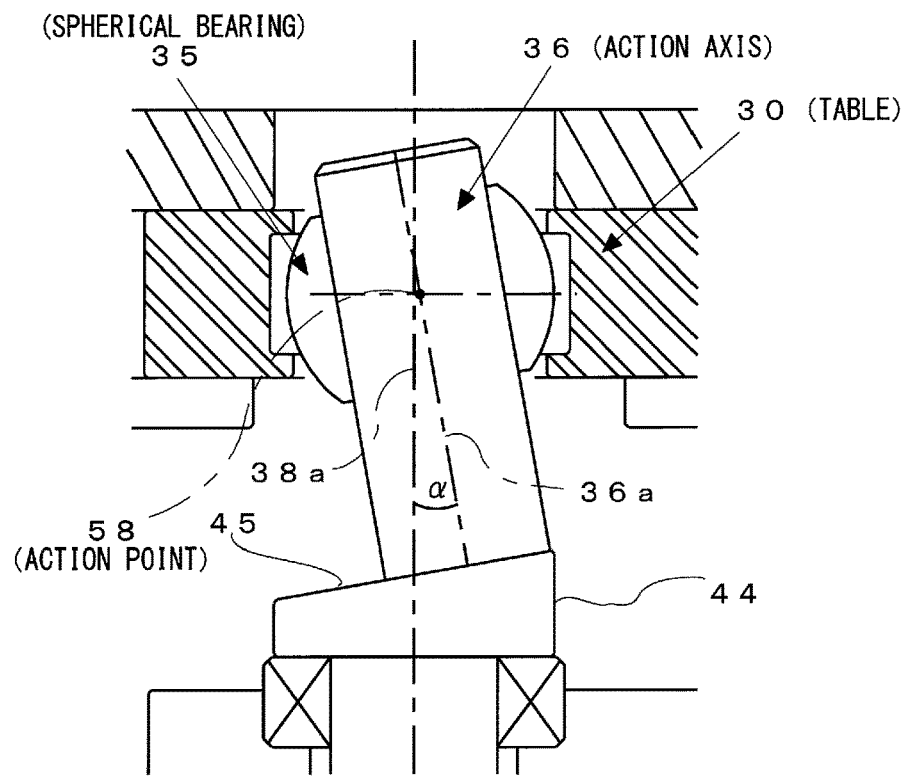
FIG. 6 is a sectional view which enlarges and illustrates main portions of FIG. 1.
Figure 7:
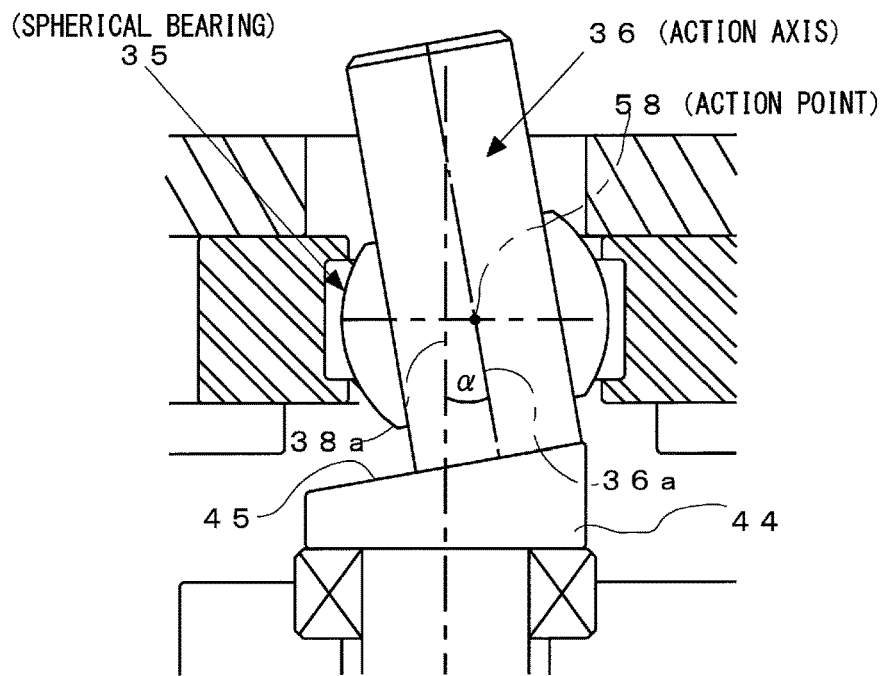
FIG. 7 is a sectional view which enlarges and illustrates main portions of FIG. 2.

At this time, as illustrated in FIGS. 6 and 7, the action axis 36 which inserts the spherical bearing 35 of the table 30 as the elevating base 46 is raised, changes the horizontal distance between the center line 38a of the main axis 38 and an action point 58 by changing the position of the action point 58 which is engaged with the spherical bearing 35 while changing the stroke linearly.

Therefore, the horizontal distance between the center line 38a of the main axis 38 and the action point 58, is enlarged from the position illustrated in FIG. 6 to the position illustrated in FIG. 7, and as illustrated in FIG. 3, the action axis 36 moves from an original position illustrated by one-dot chain line to the position illustrated by the solid line. According to this, it is needless say that the center point O of the table 30 also moves from the original position illustrated by one-dot chain line to the position illustrated by the solid line.

Figure 5:
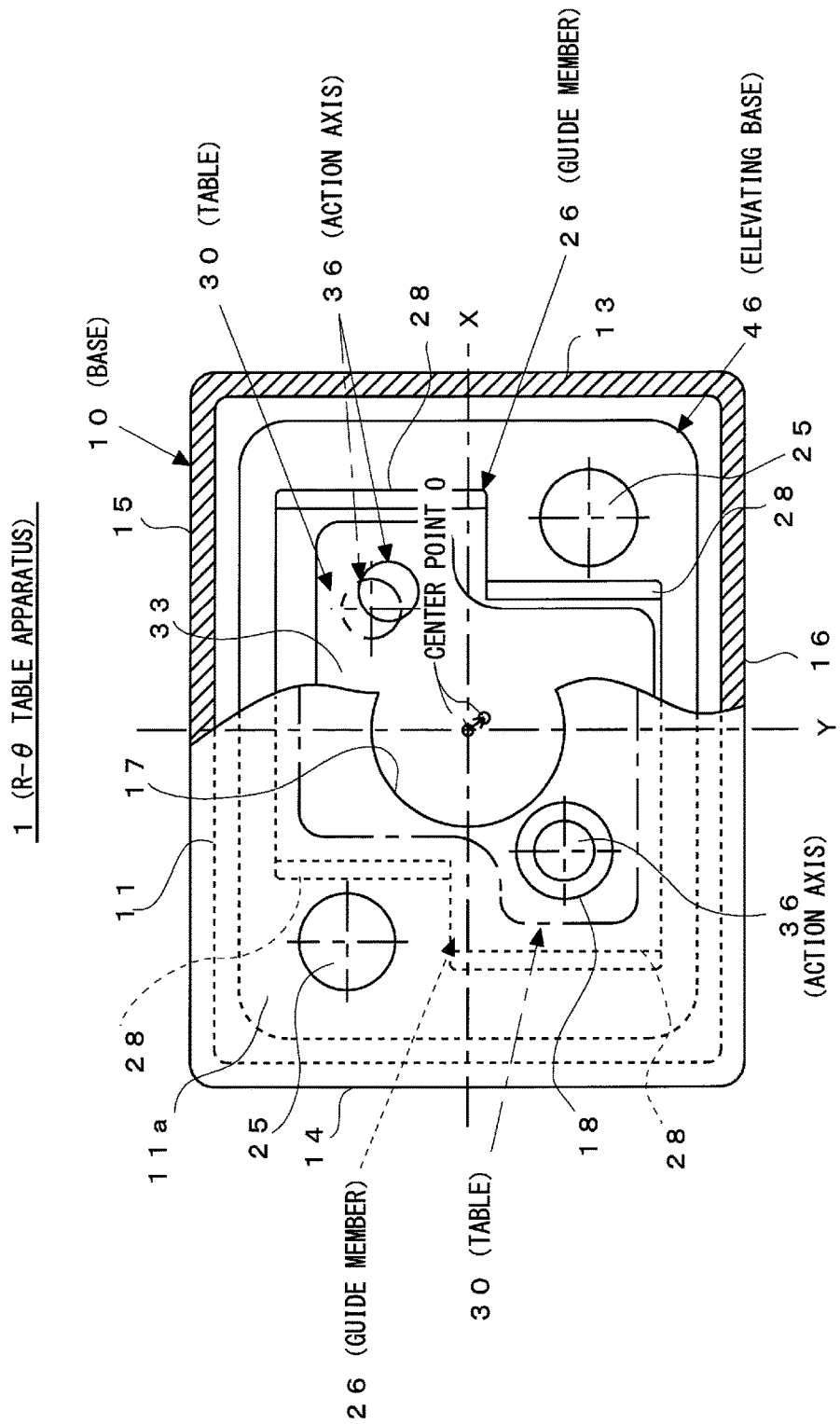
FIG. 5 is a schematic plan view which cuts through and illustrates a part of the R-θ table apparatus of FIG. 4.

In addition, in FIGS. 3 and 5, a state where the table 30 and the action axis 36 which are illustrated in a left half of a paper surface are stopped at the original position is illustrated, and a state where the table 30 and the action axis 36 which are illustrated in a right half of the paper surface are moved is illustrated.

As described above, in the R-θ table apparatus 1 according to the embodiment, as the control apparatus 60 outputs the control signal which drives the elevating apparatus 50 and raises the elevating base 46 in a state where the action axis 36 linked to the driving apparatus 37 is set to be in the initial state as illustrated in FIG. 1, as illustrated in FIG. 3, the table 30 can be horizontally moved on the guide member 26 based on the inclination angle α provided in the action axis 36.

Therefore, according to a fixing position of the action axis 36, for example, the control apparatus 60 operates the driving apparatus 37, rotates the main axis 38, and rotates the action axis 36 from the fixing position illustrated in FIG. 1 by 180°. After this, similarly, when the elevating apparatus 50 is driven and the elevating base 46 is raised, as illustrated in FIG. 5, the action axis 36 can move in the X-axis direction (to the lower side of the paper surface) as illustrated by the solid line from the original position illustrated by one-dot chain line.

In addition, in the R-θ table apparatus 1 according to the embodiment, in a process of elevating the elevating base 46 from the initial state illustrated in FIG. 1 to the position illustrated in FIG. 2, when the control apparatus 60 outputs the control signal which rotates the main axis 38 with respect to the driving apparatus 37, the action axis 36 rotates by using the original position illustrated in FIG. 1 as a center point. According to this, it is needless to say that the table 30 horizontally moves on the guide member 26, and the center point O of the table 30 also moves in a circumferential direction without rotation by using the original position illustrated by one-dot chain line as a center point.

In addition, in the R-θ table apparatus 1 according to the embodiment, in the process of elevating the elevating base 46 from the initial state illustrated in FIG. 1 to the position illustrated in FIG. 2, when the control apparatus 60 outputs the control signal which rotates the main axis 38 by a predetermined angle with respect to the driving apparatus 37, the action axis 36 rotates by the predetermined angle by using the original position illustrated in FIG. 1 as a center point. According to this, it is needless to say that the table 30 horizontally moves on the guide member 26, and the center point O of the table 30 also moves in a circumferential direction without the rotation by using the original position illustrated by one-dot chain line as a center point.

In addition, in the R-θ table apparatus 1 according to the embodiment, after the control apparatus 60 outputs the signal which rotates the main axis 38 so that the center line 36a of the action axis 36 becomes parallel to the Y-axis with respect to the driving apparatus 37, and rotates the center line 36a of the action axis 36 to be parallel to the Y-axis, when the elevating base 46 is moved, for example, from the position of FIG. 1 to the position of FIG. 2 with respect to the elevating apparatus 50, the table 30 can horizontally move on the guide member 26, and can move in the rightward direction of the paper surface to be separated from the center point O being parallel to the Y-axis.

In addition, in the R-θ table apparatus 1 according to the embodiment, after the control apparatus 60 outputs the signal which rotates the main axis 38 so that the center line 36a of the action axis 36 becomes parallel to the X-axis with respect to the driving apparatus 37, and rotates the center line 36a of the action axis 36 to be parallel to the X-axis, when the elevating base 46 is moved, for example, from the position of FIG. 1 to the position of FIG. 2 with respect to the elevating apparatus 50, the table 30 can horizontally move on the guide member 26, and can move in the rightward direction of the paper surface to be separated from the center point O being parallel to the X-axis.

As described above, according to the R-θ table apparatus 1 according to the embodiment, a mechanism which changes the horizontal distance between the center line 38a of the main axis 38 and the action point 58 by linking the action axis 36 which is inclined with respect to the main axis 38 to the driving apparatus 37 as a mechanism which changes the stroke linearly, and by changing the position in the axial direction of the spherical bearing 35 including the action axis 36, is employed. Therefore, in order to hold the table 30 to be horizontal all the time, the spherical bearing 35 provided between the action axis 36 and the table 30 follows the change in angle for cancelling the inclination, and operating the program can be realized at high rigidity with respect to the external force from all of the directions, such as the forward-and-rearward and leftward-and-rightward directions and the rotational direction.

In addition, in the R-θ table apparatus 1 according to the embodiment, in order to ensure the forward-and-rearward and leftward-and-rightward directions and the rotational direction of the table 30 all the time, the action axis 36 which is linked to the driving apparatus 37 is synchronously operated by preparing two action axes 36. Therefore, when the table 30 is nipped by the guide member 26 for holding the table 30 to be horizontal and the rear surface 11b of the top plate 11, it is possible to realize the function without using any other guide mechanisms. The synchronization operation of two action axes 36 is achieved by configuring the driving apparatus 37 by the servo motor or the stepping motor, and by controlling the driving apparatus 37 by the control apparatus 60.

In addition, in the R-θ table apparatus 1 according to the embodiment, by changing a perpendicular position of the main axis 38 of the driving apparatus 37 provided in the elevating base 46 by the elevating apparatus 50, it is possible to change the stroke of the action axis 36. In the elevating apparatus 50, the servo motor or the stepping motor is employed in order to reliably determine the position of the table 30, but a linear motion apparatus, such as a ball thread, can also be employed.

In addition, in the R-θ table apparatus 1 according to the embodiment, since the part between the elevating base 46 which loads the driving apparatus 37 which elevates without changing the forward-and-rearward and leftward-and-rightward directions and the rotational direction all the time, and the elevating apparatus 50 which is fixed to the bottom plate 12 of the base 10, is used as a linear guide in which a plurality of posts 25 having a necessary thickness are used, the rigidity is high.

In addition, in the embodiment, a case where the action axis 36 is provided on the inclined surface 45 of the linking body 44 to be inclined with respect to the center line 38a of the main axis 38 is described, but the present invention is not limited thereto, and the action axis 36 may be formed to be integrated with the linking body 44 to be inclined with respect to the center line 38a of the main axis 38. In this case, the linking body 44 may be formed to be integrated with the main body 44a and the columnar body 44b. In other words, the action axis 36, the linking body 44, the main body 44a, and the columnar body 44b are integrally formed as one component. In the component, since the action axis 36 is connected to the linking body 44 to be inclined with respect to the center line 38a of the main axis 38, it is not necessary to provide the inclined surface 45.

Figure 14:
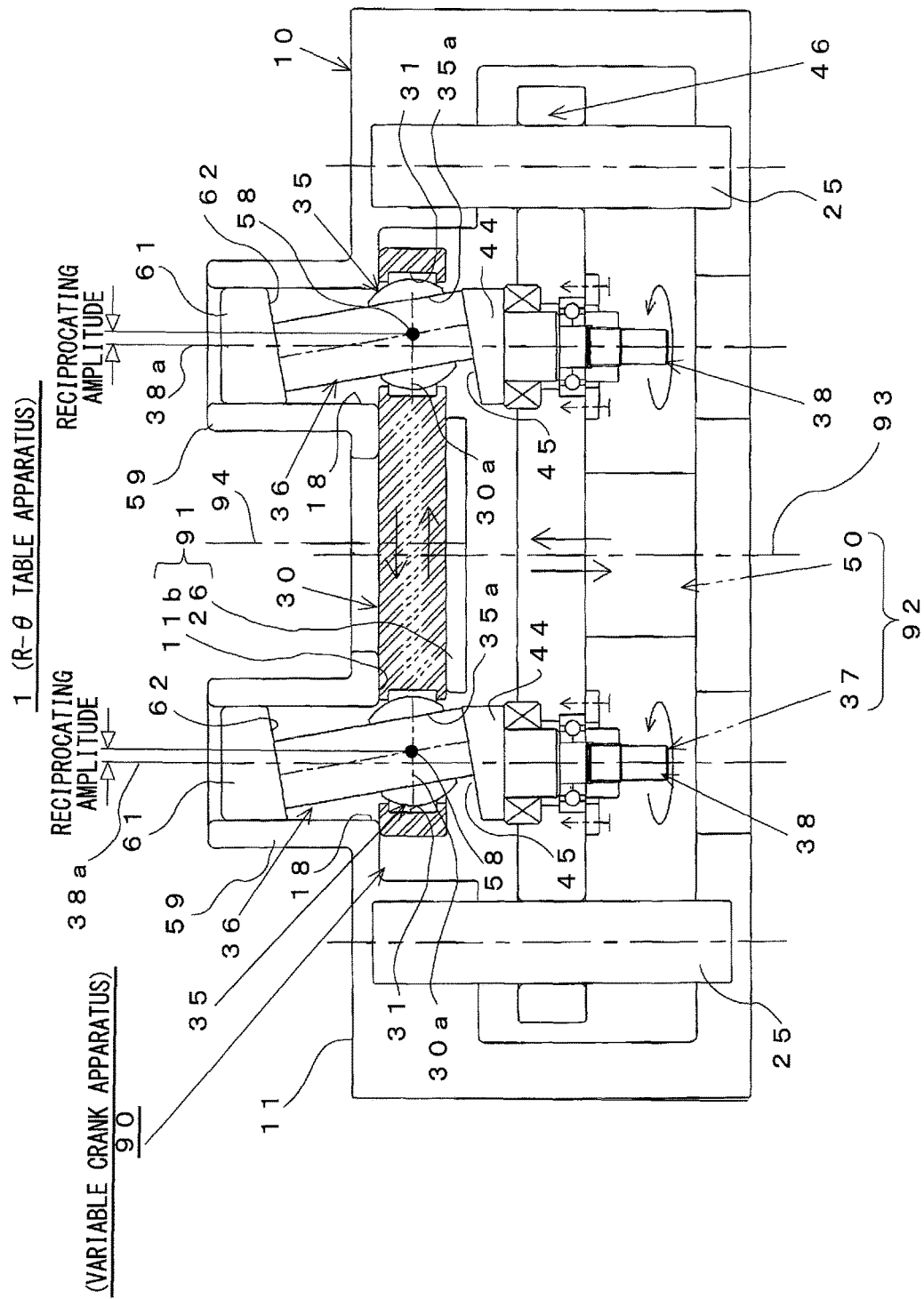
FIG. 14 is a sectional view illustrating a modification example of the R-θ table apparatus according to the first embodiment of the present invention.

In addition, in the R-θ table apparatus 1 according to the embodiment, a case where the substantially circular through hole 18 is provided in a region in which the action axis 36 goes in and out with respect to the top plate 11 is described, but the present invention is not limited thereto, and for example, as illustrated in FIG. 14, a cylindrical projected portion 59 may be provided on an upper portion side of the through hole 18, a crank axis 61 may be provided in the tip end portion of the action axis 36, and the crank axis 61 may be configured to be slidable in the cylindrical projected portion 59.

An inner surface of the cylindrical projected portion 59 functions as a bearing which can make the crank axis 61 provided in the tip end portion of the action axis 36 slidable. The crank axis 61 makes the same shape as the linking body 44, and a bonding surface 62 bonded with the action axis 36 becomes an inclined surface which is inclined by the same angle as that of the inclined surface 45. In other words, the bonding surface 62 and the inclined surface 45 are parallel to each other.

In addition, in FIG. 14, the driving apparatus 37 and the elevating apparatus 50 are omitted. In addition, in FIG. 14, a reference numeral 93 illustrates the center of the guide member 26, and a reference numeral 94 illustrates the center of a tool loaded in the R-θ table apparatus 1.

In addition, in the R-θ table apparatus 1 according to each of the above-described embodiments, as illustrated in FIG. 14, a variable crank apparatus 90 according to the present invention is employed.

The variable crank apparatus 90 according to the present invention includes an inclined crankpin (action axis) 36 which is inclined with respect to the center line 38a of the main axis 38, and is connected to the main axis 38; a table (body to be moved) 30 in which the spherical bearing 35 which has the through hole 35a into which the inclined crankpin (action axis) 36 is inserted is provided in the through hole 31; a guide apparatus 91 which is configured of the guide member 26 that holds the table (body to be moved) 30 to be freely movable, and the rear surface 11b of the top plate 11; and an adjusting apparatus (driving apparatus 37, elevating apparatus 50) 92 which rotates and moves the inclined crankpin (action axis) 36, and stops rotation or stops movement of the inclined crankpin 36 so as to change the position of the action point 58 at which the inclined crankpin (action axis) 36 and a center line 30a of the table (body to be moved) 30 are engaged with each other in the through hole 35a of the spherical bearing 35.

According to the variable crank apparatus 90 according to the present invention, by changing the distance between the center line 38a of the main axis 38 and the action point 58 by the adjusting apparatus (driving apparatus 37, elevating apparatus 50) 92, and by moving the table (body to be moved) 30 to an arbitrary position without rotating along the guide apparatus (the guide member 26 and the rear surface 11b of the top plate 11) 91, it is possible to simply change the amplitude.

Therefore, in the variable crank apparatus 90 according to the present invention, the structures or the shapes of the base 10, the driving apparatus 37, the elevating base 46, and the elevating apparatus 50 which are used in the above-described embodiments, are different, integrated, or omitted according to the employment target or the use purpose.

Figure 4:
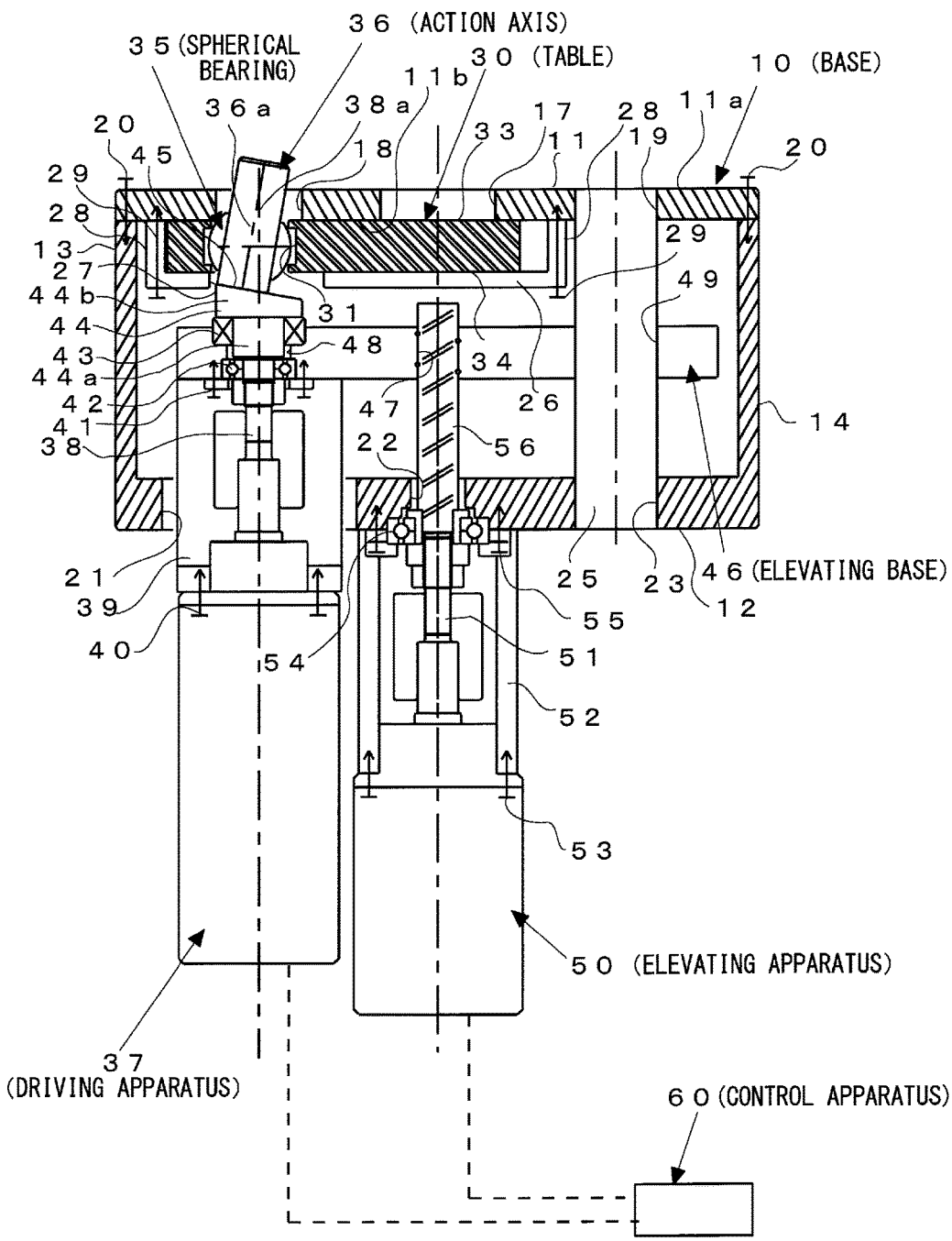
FIG. 4 is a sectional view illustrating a state in which the elevating base of the R-θ table apparatus according to the first embodiment of the present invention is raised and an angle of an action axis is changed, from the side view.

In addition, similar to the above-described embodiments, the adjusting apparatus (driving apparatus 37, elevating apparatus 50) 92, for example, is configured to be linked to the control apparatus 60 illustrated in FIGS. 1, 2, and 4, and to control the movement according to the forward-and-rearward and leftward-and-rightward directions and the rotational direction of the inclined crankpin (action axis) 36 with respect to the table (body to be moved) 30 by the program embedded in the control apparatus 60. The program can be arbitrarily constructed in accordance with the use method of the R-θ table apparatus 1 according to the embodiment.

Second Embodiment

Next, a second embodiment in which the R-θ table apparatus 1 according to the embodiment is employed in an internal thread processing apparatus 70 which processes an internal thread 79 will be described based on FIGS. 8 and 9.

The internal thread processing apparatus 70 according to the embodiment includes the R-θ table apparatus 1 according to the first embodiment; an external thread shaped tool 71 which is fixed and loaded onto the center point O of the table 30 of the R-θ table apparatus 1 via a fastening bolt 74; and a fastening bolt 78 which is a support member that fixes a metal material 75 to the upper surface 11a of the top plate 11 of the base 10 of the R-θ table apparatus 1.

In the metal material 75, a hole 76 for processing the internal thread 79 is provided.

The metal material 75 includes an annular portion 77 which is fitted to the through hole 17 of the top plate 11, and after making the annular portion 77 fitted into the through hole 17, the metal material 75 is fixed to the upper surface 11a of the top plate 11 by the fastening bolt 78.

The external thread shaped tool 71 includes a processing portion 72 in which the internal thread 79 to be processed has the same pitch, and which makes a thread shape having a small diameter. In the external thread shaped tool 71, a bottom portion 73 is fixed onto the center point O of the table 30 by the plurality of fastening bolts 74.

The control apparatus 60 moves the action axis 36 in the X-axis direction, in the Y-axis direction, and in the rotational direction, and controls the driving of the driving apparatus 37 and the elevating apparatus 50 to follow the trajectory drawn by the table 30 using an expression $(X^2+Y^2=R^2)$. In other words, the control apparatus 60 controls the table 30 to perform arc reciprocating by showing a necessary pressing force with respect to the internal thread processing apparatus 70.

Next, an operation of the internal thread processing apparatus 70 according to the embodiment will be described.

Figure 8:
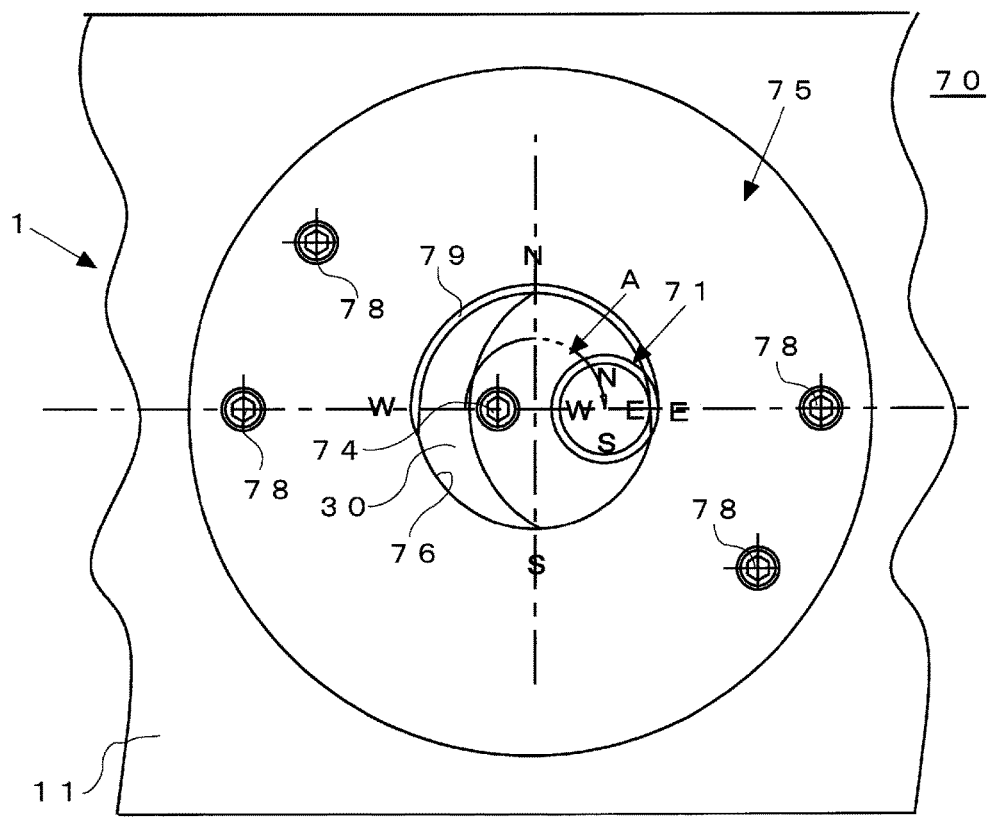
FIG. 8 is a view illustrating a second embodiment in which the R-θ table apparatus according to the first embodiment of the present invention is employed in a processing apparatus of an internal thread.
Figure 9:
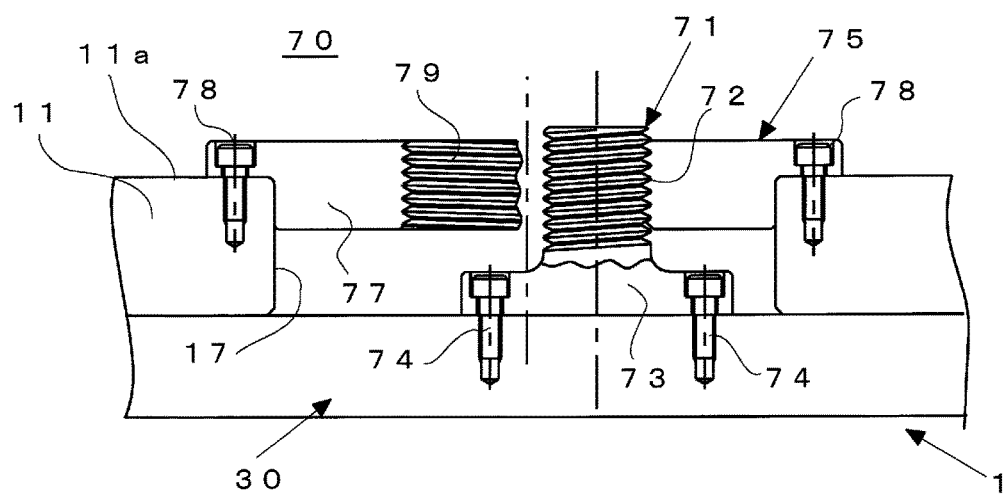
FIG. 9 is a sectional view illustrating main portions of FIG. 8.
Figure 10:
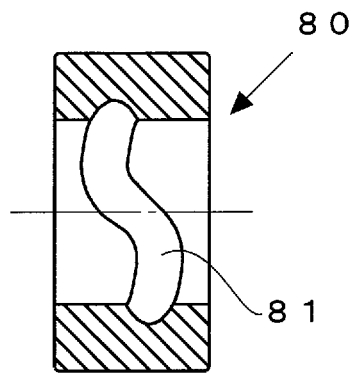
FIG. 10 is a sectional view of a nut member for a ball thread in which the internal thread processing apparatus according to the second embodiment of the present invention is employed in processing the nut member for the ball thread.
Figure 11:
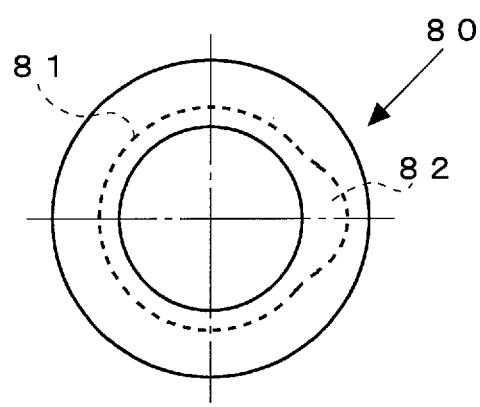
FIG. 11 is a side view illustrating the nut member for the ball thread of FIG. 10.

First, as illustrated in FIGS. 8 and 9, the external thread shaped tool 71 includes the processing portion 72 in which the pitch is the same as that of the internal thread 79 to be processed and which makes a thread shape in which the diameter is smaller than that of the internal thread 79 to be processed. The external thread shaped tool 71 is fixed onto the table 30 by the fastening bolt 74.

Next, after the metal material 75 is fitted to the through hole 17 of the top plate 11 to be inserted into the hole 76 from an upper part of the external thread shaped tool 71, the metal material 75 is fixed onto the upper surface 11a of the top plate 11 by the fastening bolt 78.

Next, the control apparatus 60 drives the driving apparatus 37 and the elevating apparatus 50, and freely moves the table 30 without rotating in the forward-and-rearward and leftward-and-rightward directions and in the rotational direction on the guide member 26 via the action axis 36.

Next, the control apparatus 60 controls the movement of the driving apparatus 37 and the elevating apparatus 50 to follow the trajectory drawn by the table 30 using the expression $(X^2+Y^2=R_2)$.

Next, as illustrated in FIG. 8, the control apparatus 60 moves the external thread shaped tool 71 fixed to the table 30 along the movement trajectory illustrated by an arrow A on the inner circumference of the hole 76 having the metal material 75 fixed onto the top plate 11. In addition, the control apparatus 60 controls the movement of the driving apparatus 37 and the elevating apparatus 50 to mold the hole 76 of the metal material 75 before internal thread molding while deforming the hole 76 into the internal thread 79.

In addition, in FIG. 8, for the description, the movement trajectory illustrated by the arrow A of the external thread shaped tool 71 is illustrated as 180°. In the embodiment, it is needless to say that the control apparatus 60 moves the external thread shaped tool 71 until the entire circumference of the hole 76 of the metal material 75 before the internal thread molding is deformed to the internal thread 79, that is, until the movement trajectory illustrated by the arrow A of the external thread shaped tool 71 becomes 360°. Therefore, the control apparatus 60 makes the external thread shaped tool 71 perform a circular movement while controlling the movement of the driving apparatus 37 and the elevating apparatus 50, consecutively presses the processing portion 72 of the external thread shaped tool 71 against the inner circumference of the hole 76, transfers the shape of the processing portion 72, and molds the thread groove.

In this process, as illustrated in FIG. 8, first, a point N of the hole 76 of the metal material 75 and a point N of the external thread shaped tool 71 come into contact with each other. Next, a point E of the hole 76 of the metal material 75 and a point E of the external thread shaped tool 71 come into contact with each other. Next, a point S of the hole 76 of the metal material 75 and a point S of the external thread shaped tool 71 come into contact with each other. Next, a point W of the hole 76 of the metal material 75 and a point W of the external thread shaped tool 71 come into contact with each other. Each rotational phase does not change. In other words, points N-E-S-W of the hole 76 of the metal material 75 and the external thread shaped tool 71 do not rotate.

During this, the metal material 75 and the external thread shaped tool 71 do not relatively move in the Z-axis direction, or it is also not necessary to relatively move in the Z-axis direction (vertical direction of the paper surface of FIG. 9).

As described above, according to the embodiment, the ring-shaped metal material 75 can be fixed to the top plate 11 by the fastening bolt 78 which is the support member, and it is possible to consecutively press the processing portion 72 of the external thread shaped tool 71 from the inner side of the hole 76 of the ring-shaped metal material 75, to transfer the shape of the processing portion 72, and to mold the thread groove. Therefore, finally, on the inner side of the hole 76 of the metal material 75, for example, the internal thread 79 having a relatively large diameter, such as M40-P1.5 (having the outer diameter of 40 mm and a pitch of 1.5 mm), can be formed.

In addition, in the internal thread processing apparatus 70, for example, a molding process can be programmed so that a hole diameter R of the internal thread 79 starts from R which is somewhat small, and consecutive molding is performed to reach the screw thread in several circumferences.

In addition, in the embodiment, the metal material 75 is fixed to the top plate 11 by the fastening bolt 78 which is the support member, but the present invention is not limited thereto, and the metal material 75 may be fixed to the top plate 11 via firmly fixing means which is a support member.

In addition, in the embodiment, a case where the internal thread 79 is molded as the external thread shaped tool 71 rotates one time in the hole 76 of the metal material 75, but the present invention is not limited thereto, and the control apparatus 60 can perform the control so that the external thread shaped tool 71 revolves plural times in the hole 76 of the metal material 75.

In addition, in the embodiment, a single-screw internal thread is described, but the present invention is not limited thereto, and by using a double-screw external thread shaped tool, it is possible to mold a double-screw internal thread.

Furthermore, in a loop groove which makes a cross every one screw for a ball thread, a groove of which the depth of one part, such as a ball circulating bypass, is deeper than other parts, can also be molded by using the tool. It is needless to say that an inner diameter surface in which a plurality of closed loop grooves are present also can be molded at the same time.

As an example thereof, by using FIGS. 10 to 13, a nut member for a ball thread 80 which processes a female circulating path 81 provided with an S-shaped bypass 82 formed for returning the ball to one pitch before, will be described.

Figure 12:
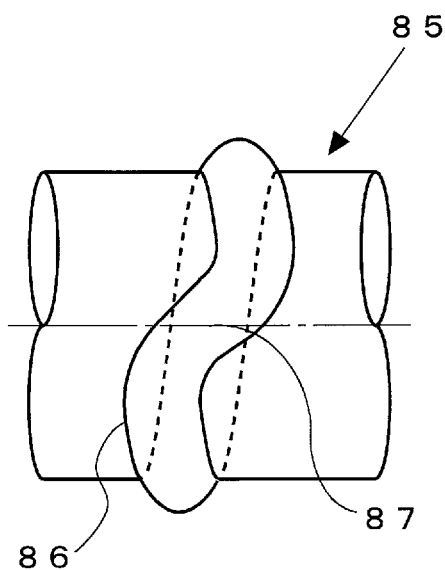
FIG. 12 is a front view illustrating an external thread shaped tool which processes the nut member for the ball thread of FIG. 10.
Figure 13:
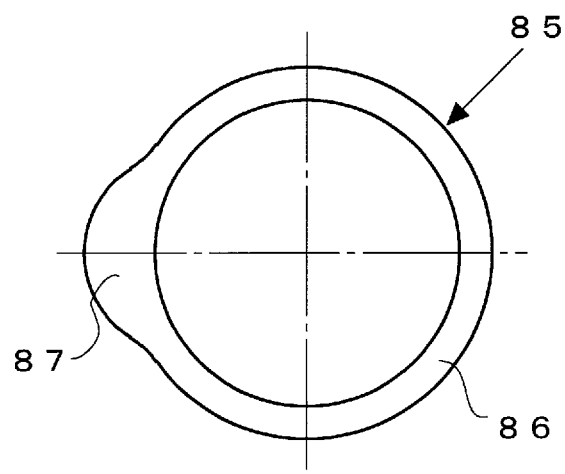
FIG. 13 is a side view of FIG. 12.

FIGS. 12 and 13 illustrate an external thread shaped tool 85 which processes the nut member for a ball thread 80 having the female circulating path 81 provided with the S-shaped bypass 82. A processing portion 87 which processes the S-shaped bypass 82 protrudes further to the outside than a processing portion 86 which forms the female circulating path 81.

For example, in FIGS. 8 and 9, the external thread shaped tool 85 is used being exchanged with the external thread shaped tool 71 fixed onto the center point O of the table 30.

In addition, as the metal material before processing the nut member 80, similar to the metal material 75 having the hole 76 in the second embodiment, a metal material having a hole which corresponds to the hole of the nut member 80 is prepared and is fixed to the top plate 11.

In the embodiment, the processing method is also the same as that of the second embodiment.

In addition, in the embodiment, the nut member for a ball thread 80 which processes the female circulating path 81 provided with one S-shaped bypass 82 by using the external thread shaped tool 85 provided with the processing portion 86 which forms one group of female circulating paths 81 and the processing portion 87 which processes the S-shaped bypass 82, is described, but the present invention is not limited thereto, and the nut member for a ball thread 80 which processes a plural groups of the female circulating paths 81 provided with the S-shaped bypass 82 by using the external thread shaped tool 85 provided with the processing portion 86 which forms the plural groups of female circulating paths 81 and the processing portion 87 which processes the S-shaped bypass 82, can be processed.

Third Embodiment

FIGS. 15 to 18 illustrate a pumping apparatus of a variable discharge quantity 100 according to a third embodiment of the present invention.

The pumping apparatus of a variable discharge quantity 100 according to the embodiment includes a variable crank apparatus 101 according to the present invention, and a cylinder block 120.

The variable crank apparatus 101 includes a main axis 102 which is linked to a linking body 103. The main axis 102 is rotated by a driving force of a motor or a flywheel. The main axis 102 is inserted into a through hole 113 of a crank axial base 112, and is held to be freely rotatable by a bearing apparatus 114. An outer circumference of the bearing apparatus 114 is fixed to the crank axial base 112 via a thread 116, via an attachment frame 115.

In the linking body 103, for example, an upper surface of a main body 103a which is configured of a columnar body is a columnar body 103b which has the outer diameter that is greater than that of the main body 103a, and an inclined surface 104 is formed on a tip end surface of the columnar body 103b. The linking body 103 interposes a bearing apparatus 117 in a step portion which makes a boundary between the main body 103a and the columnar body 103b, and is mounted to be freely rotatable on the crank axial base 112.

An inclined crankpin (action axis) 105 which is inclined with respect to a center line 102a of the main axis 102 is assembled to the inclined surface 104 of the linking body 103. The inclined crankpin (action axis) 105 is inserted into a through hole 109 of a spherical bearing 108 assembled to a through hole 111, and is assembled to a connection rod 110. The tip end portion of the inclined crankpin (action axis) 105 is linked to a crank axis 106 via an inclined surface 107. The inclined surface 107 of the crank axis 106 is inclined by the same angle as that of the inclined surface 104 of the linking body 103.

The crank axial base 112 is supported via a plurality of guide posts 118. The plurality of guide posts 118 are assembled to the cylinder block 120. For example, similar to the embodiments illustrated in FIGS. 1, 2, and 4, the crank axial base 112 is linked to the control apparatus 60, and is moved in the leftward-and-rightward direction in the drawing by a position adjusting portion (a servo motor or a stepping motor illustrated by the elevating apparatus 50) controlled by the control apparatus 60. The position adjusting portion which moves the crank axial base 112 may be, for example, a known linear motion mechanism combined by a thread sending mechanism and a motor. In addition, both the control apparatus and the position adjusting portion are omitted in the drawing.

The cylinder block 120 includes a through hole 121 which makes the linking body 103 of the variable crank apparatus 101 appear to be freely rotatable; and a through hole 122 which disposes the crank axis 106 of the variable crank apparatus 101 to be freely rotatable and slidable, on the same axis.

In addition, the cylinder block 120 includes a space 123 which vertically moves the connection rod 110 of the variable crank apparatus 101 inside thereof. Below the space 123, a recessed portion 124 which guides a lower end portion 110a of the connection rod 110 of the variable crank apparatus 101 to be freely slidable, is provided.

Meanwhile, above the space 123, a piston 126 which is assembled to an upper end portion 110b of the connection rod 110 of the variable crank apparatus 101 via a piston pin 125 is disposed. Above the piston 126, a pressure oil chamber 127 which guides the piston 126 to be freely slidable is formed. In the pressure oil chamber 127, an introduction tube 128 which suctions oil from the outside, and an introduction tube 129 which discharges the oil to the outside, are provided. In the introduction tubes 128 and 129, check valves 130 and 131 are respectively provided.

In the embodiment, the guide apparatus of the connection rod 110 of the variable crank apparatus 101 includes the space 123 which vertically moves the connection rod 110 of the variable crank apparatus 101, and the recessed portion 124 which guides the lower end portion 110a of the connection rod 110 of the variable crank apparatus 101 to be freely slidable.

In addition, the adjusting apparatus includes a driving power source, such as an engine, a motor, or a flywheel, which rotates the main axis 102, the position adjusting portion which moves the crank axial base 112, and the control apparatus (for example, the control apparatus 60 in the embodiments illustrated in FIGS. 1, 2, and 4 corresponds thereto). The position adjusting portion which moves the crank axial base 112 is not particularly limited if the portion has a mechanism and a structure which make the crank axial base 112 approach/separate from the cylinder block 120, similar to an oil pressure pump or an actuator.

Next, an operation of the pumping apparatus of a variable discharge quantity 100 according to embodiment will be described.

Figure 15:
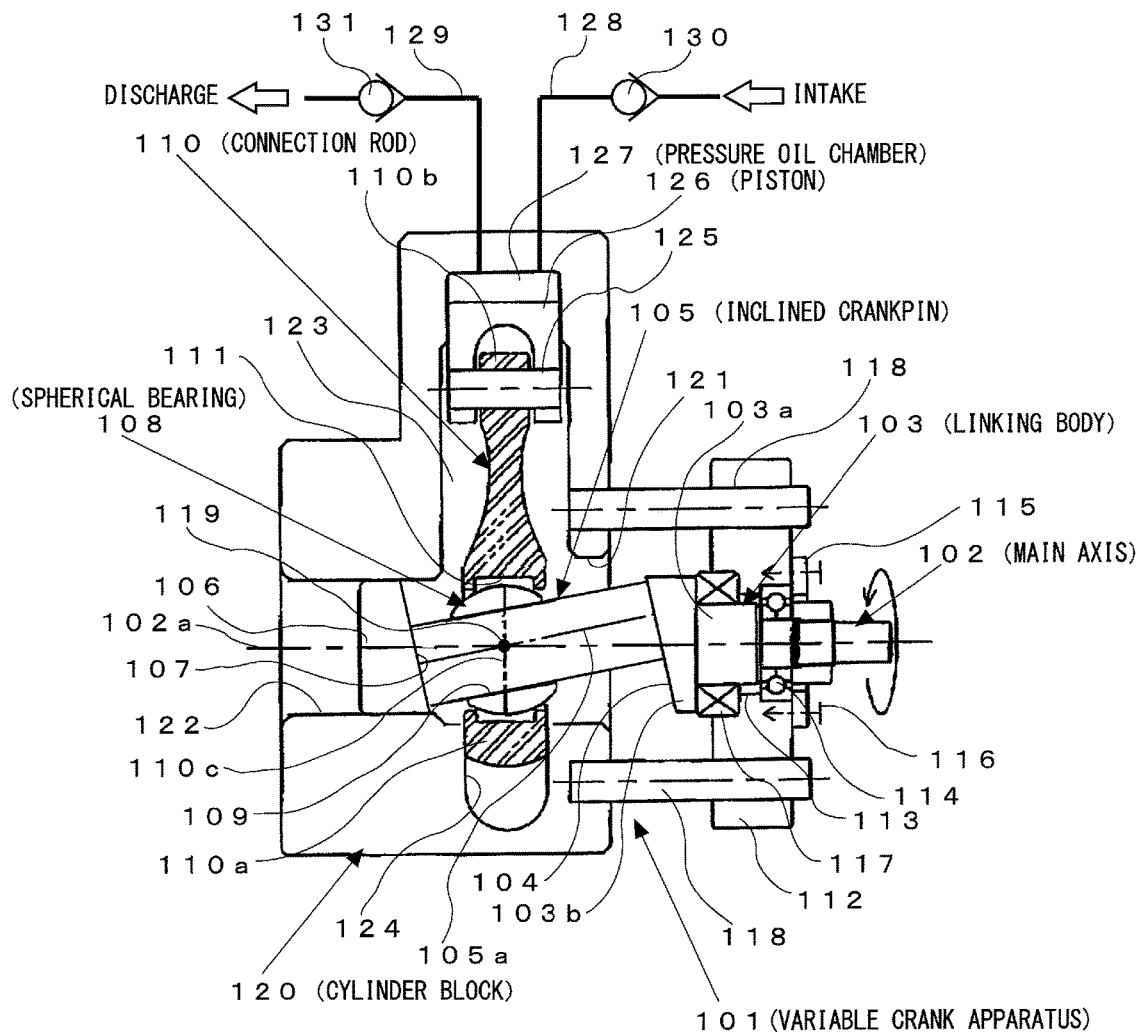
FIG. 15 is a sectional view illustrating a pumping apparatus of a variable discharge quantity according to a third embodiment of the present invention.
Figure 16:
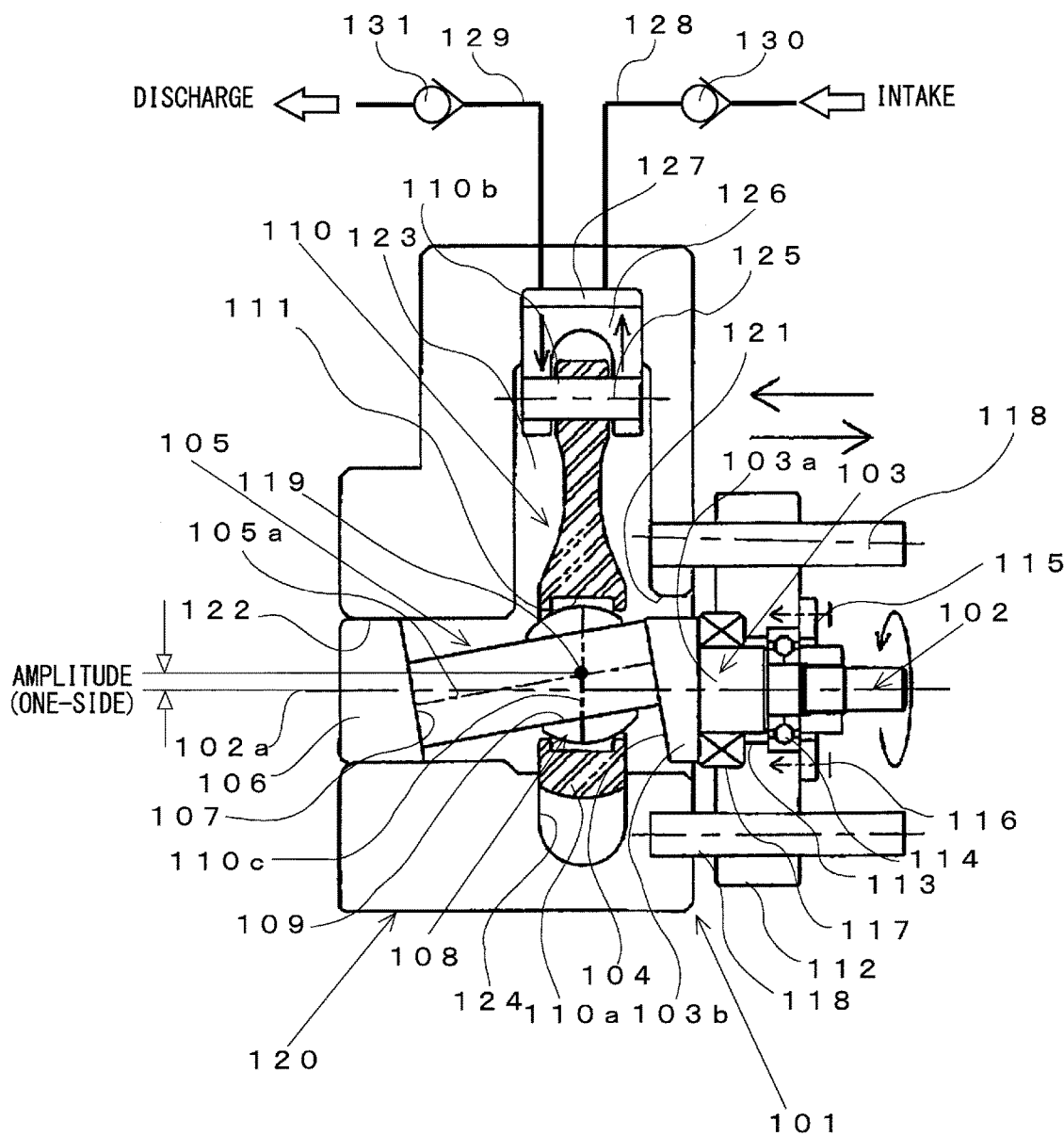
FIG. 16 is a sectional view illustrating a state in which a piston of the pumping apparatus of a variable discharge quantity according to the third embodiment of the present invention is raised to a peak position.

In the pumping apparatus of a variable discharge quantity 100 according to the embodiment, in a state where the main axis 102 does not rotate the crank axial base 112, for example, when the crank axial base 112 is moved in the leftward-and-rightward direction in the drawing from a state of FIG. 15 to a state of FIG. 16, a position of an action point 119 at which a center line 105a of the inclined crankpin 105 and a center line 110c of the connection rod 110 are engaged with each other, is changed. Accordingly, even in a state where the main axis 102 does not rotate, when the crank axial base 112 is moved in the leftward-and-rightward direction in the drawing, the position of the action point 119 moves in the vertical direction in the drawing along the inclination of the inclined crankpin 105. At this time, for example, as illustrated in FIG. 16, the piston 126 assembled to the connection rod 110 also moves in the vertical direction only by the movement of the action point 119. In FIG. 16, the movement amount is illustrated as the amplitude (one side).

In a state where the position of the action point 119 and the center line 102a of the main axis 102 are shifted, when rotating the main axis 102, for example, as illustrated in FIG. 16, the piston 126 assembled to the eccentric connection rod 110 reciprocates in the vertical direction in the drawing. The size of the stroke of the piston 126 increases as the shift between the position of the action point 119 and the center line 102a of the main axis 102 increases.

According to the pumping apparatus of a variable discharge quantity 100 according to the embodiment, for example, from the state illustrated in FIG. 15 to the state illustrated in FIG. 16, when moving the crank axial base 112 by the control apparatus by the external force which is not illustrated while rotating the main axis 102 in the rotational direction illustrated by an arrow, the connection rod 110 moves the piston 126 toward the pressure oil chamber 127 via the piston pin 125, and the piston 126 compresses oil in the pressure oil chamber 127. In addition, at a point when the pressure in the pressure oil chamber 127 reaches a predetermined value, the oil is discharged to the outside via the introduction tube 129.

At this time, the inclined crankpin (action axis) 105 into which the spherical bearing 108 provided in the connection rod 110 is inserted according to the movement of the crank axial base 112 which is moved by the position adjusting portion and the control apparatus, changes the distance (illustrated as the amplitude (one side) in FIG. 16) between the center line 102a of the main axis 102 and the action point 119 by changing the position of the action point 119 at which the inclined crankpin (action axis) 105 and the center line 110c of the connection rod 110 are engaged with each other in the through hole 109 of the spherical bearing 108 while changing the stroke linearly, similar to the action of the action axis 36 in the first embodiment illustrated in FIGS. 6 and 7.

Figure 18:
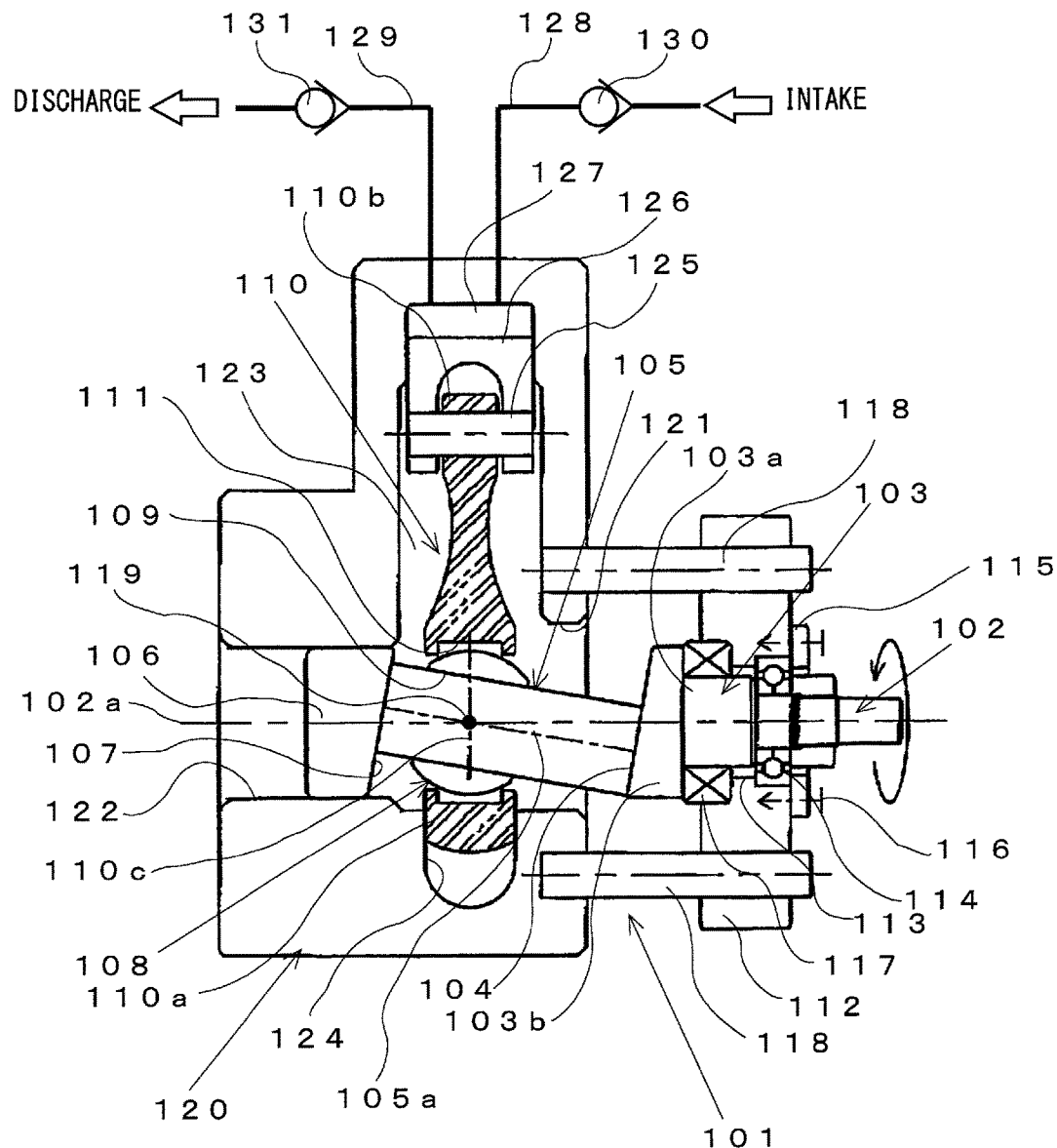
FIG. 18 is a sectional view illustrating a state in which the piston of the pumping apparatus of a variable discharge quantity according to the third embodiment of the present invention is moved to a stop position.

The pumping apparatus of a variable discharge quantity 100 according to the embodiment can move the piston 126 to a bottom position as illustrated in FIG. 18, while rotating the main axis 102 in the rotational direction illustrated by the arrow from the state of FIG. 15.

Figure 17:
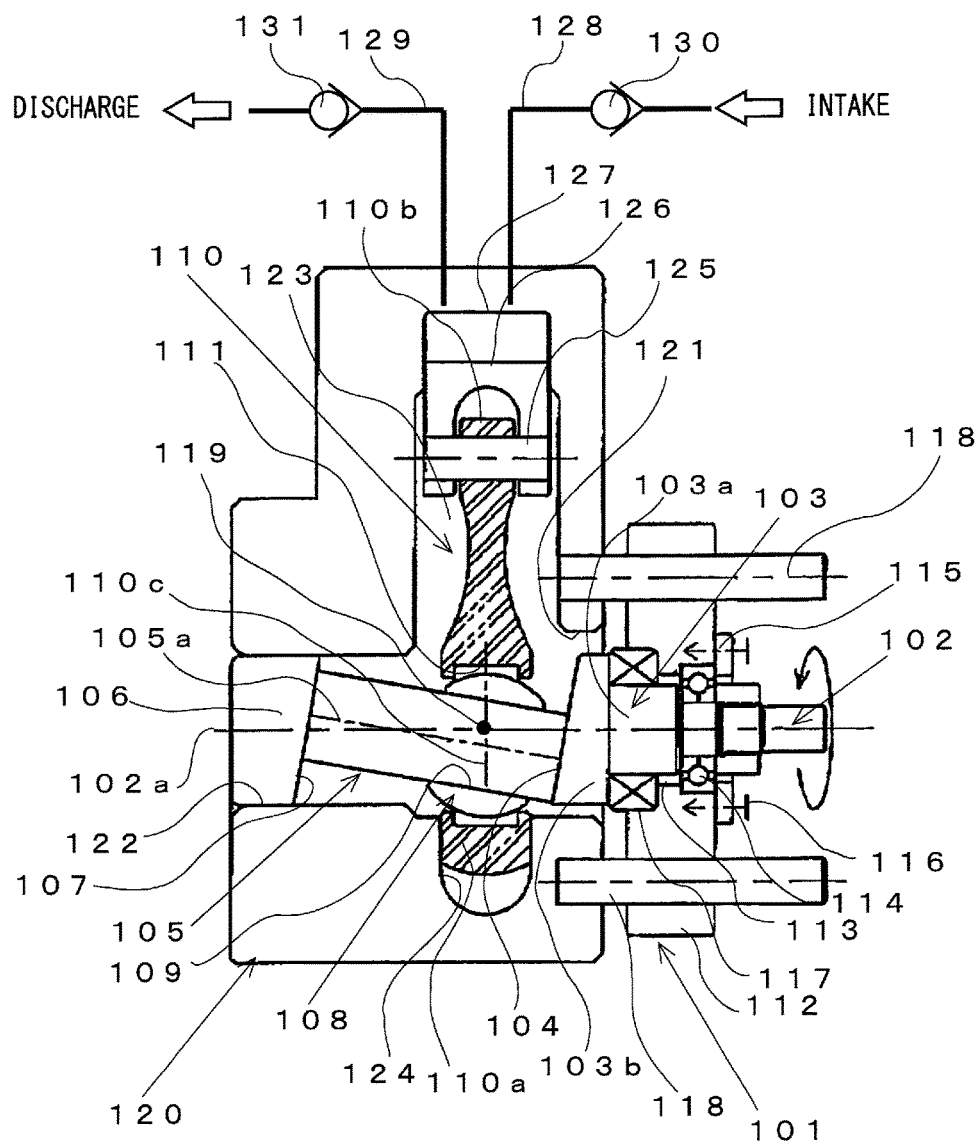
FIG. 17 is a sectional view illustrating a state in which the piston of the pumping apparatus of a variable discharge quantity according to the third embodiment of the present invention is lowered to a bottom position.

In addition, the pumping apparatus of a variable discharge quantity 100 according to the embodiment can move the piston 126 to a stop position as illustrated in FIG. 17, while rotating the main axis 102 in the rotational direction illustrated by the arrow from the state of FIG. 16.

As described above, according to the pumping apparatus of a variable discharge quantity 100 according to the embodiment, by operating the variable crank apparatus 101 according to the present invention, with respect to the connection rod 110 in the cylinder block 120 by changing the distance (illustrated as the amplitude (one side) in FIG. 16) between the center line 102a of the main axis 102 and the action point 119 by changing the position of the action point 119 engaged with the spherical bearing 108 while changing the stroke of the inclined crankpin (action axis) 105 which is inserted into the spherical bearing 108 linearly, it is possible to construct a pump which reliably supplies the oil on the suction side to the discharge side by adjusting the pressure in the pressure oil chamber 127 using the piston 126.

In addition, the pumping apparatus of a variable discharge quantity 100 according to the embodiment is not substantially different from a reciprocating pump having a constant discharge amount in the configuration components or the mechanism. The most fundamental difference between the pumping apparatus of a variable discharge quantity 100 according to the embodiment and the reciprocating pump having a constant discharge amount is that the inclined crankpin 105 is disposed to have a constant inclination with respect to the crank axis 106. This is not a necessary condition, but in the description here, a case where the crank axis 106 and the center line 105a of the inclined crankpin 105 intersect each other is described.

The crank axis 106 is disposed to be movable in the axial direction for each crank axial base 112 in which the driving apparatus (including a motor or the like which is not illustrated) is loaded, and the position thereof is controlled being independent from the rotation of the crank axis 106. Therefore, the connection rod 110 which follows the rotation of the crank axis 106 reciprocates by the amplitude which is proportional to the distance between the center axis (center axis 102a of the main axis 102) of the crank axis 106 and the center line 105a of the inclined crankpin 105 at a sectional position at this time.

The piston 126 which is connected to the connection rod 110 reciprocates while holding the phases of the peak and the bottom. When a point at which the center axis (center axis 102a of the main axis 102) of the crank axis 106 and the center line 105a of the inclined crankpin 105 intersect each other is at the sectional position at which the connection rod 110 is present, the reciprocating motion of the piston 126 is stopped, and the discharge amount of the pump becomes 0. Regardless of conformity with the use purpose, further, the inversion of the peak and the bottom is also possible.

Therefore, according to the embodiment, it is possible to simply make a variable capacity hydraulic pump which supplies pressure oil of which the amount is available to a certain motor torque regardless of discharge pressure.

The only necessary additional component is the spherical bearing 108 which complements a rolling gap which is generated between the inclined crankpin 105 and the connection rod 110. The spherical bearing 108 is a typical commercial product, and does not cause any problem. In addition, in the connection rod 110, a thrust stress in accordance with load torque is generated, but the thrust stress is not treated between the connection rod 110 and the cylinder block 120.

Fourth Embodiment

FIGS. 19 to 22 illustrate a pumping apparatus of a variable discharge quantity 100A according to a fourth embodiment of the present invention.

The pumping apparatus of a variable discharge quantity 100A according to the embodiment is different from the pumping apparatus of a variable discharge quantity 100 according to the third embodiment of the present invention in that the crank axial base 112 is disposed to be freely rotatable and slidable in the through hole 121 of the cylinder block 120, and the crank axial base 112 is moved by the position adjusting portion (not illustrated) by the external force.

In the embodiment, the position adjusting portion which moves the crank axial base 112 is not particularly limited, if the position adjusting portion includes a mechanism and a structure in which the crank axial base 112 approaches/separates from the cylinder block 120, similar to a hydraulic pump or an actuator.

Therefore, in the pumping apparatus of a variable discharge quantity 100A according to the embodiment, the plurality of guide posts which hold and guide the crank axial base 112 are not necessary.

Figure 19:
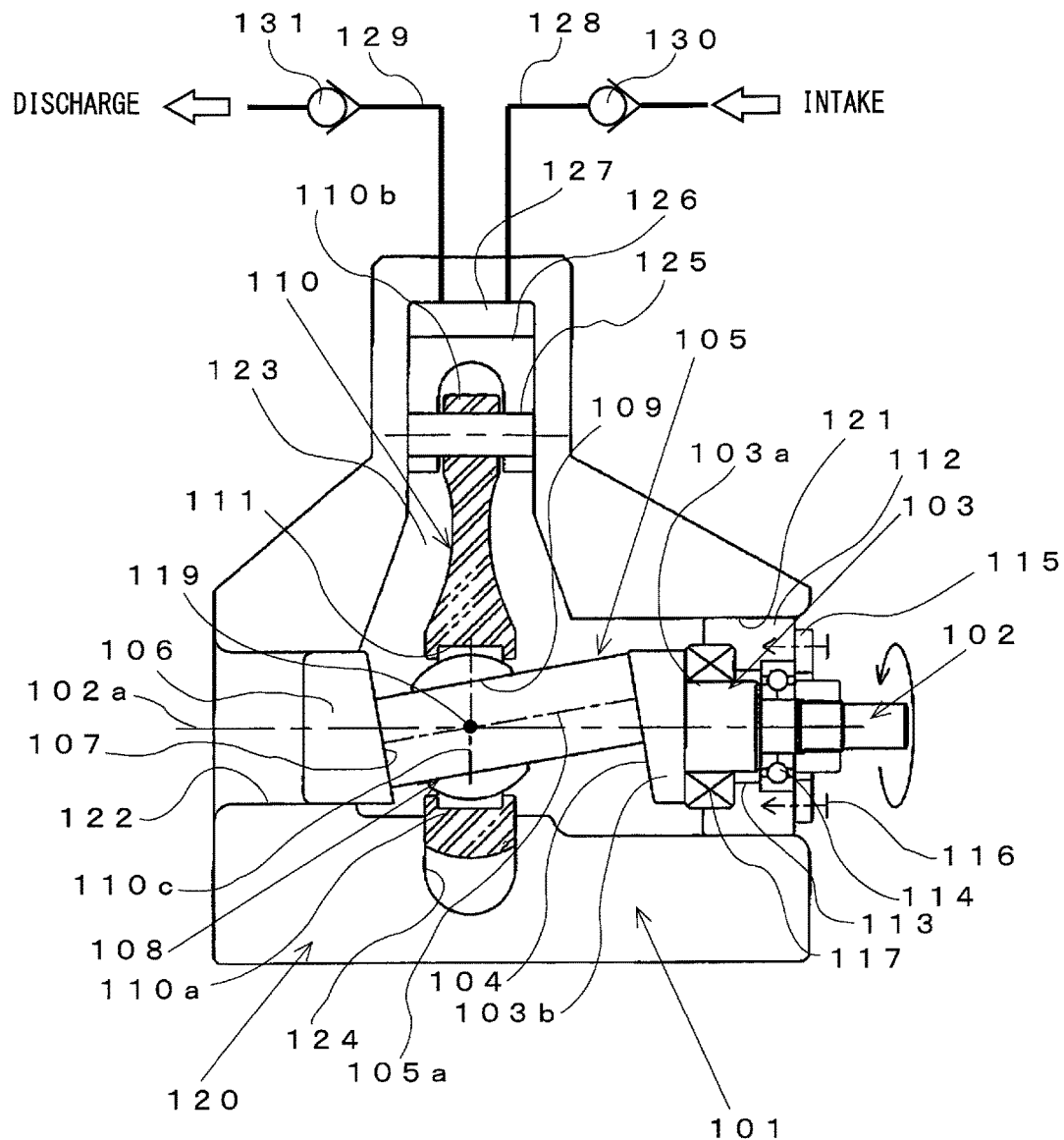
FIG. 19 is a sectional view illustrating a pumping apparatus of a variable discharge quantity according to a fourth embodiment of the present invention.
Figure 20:
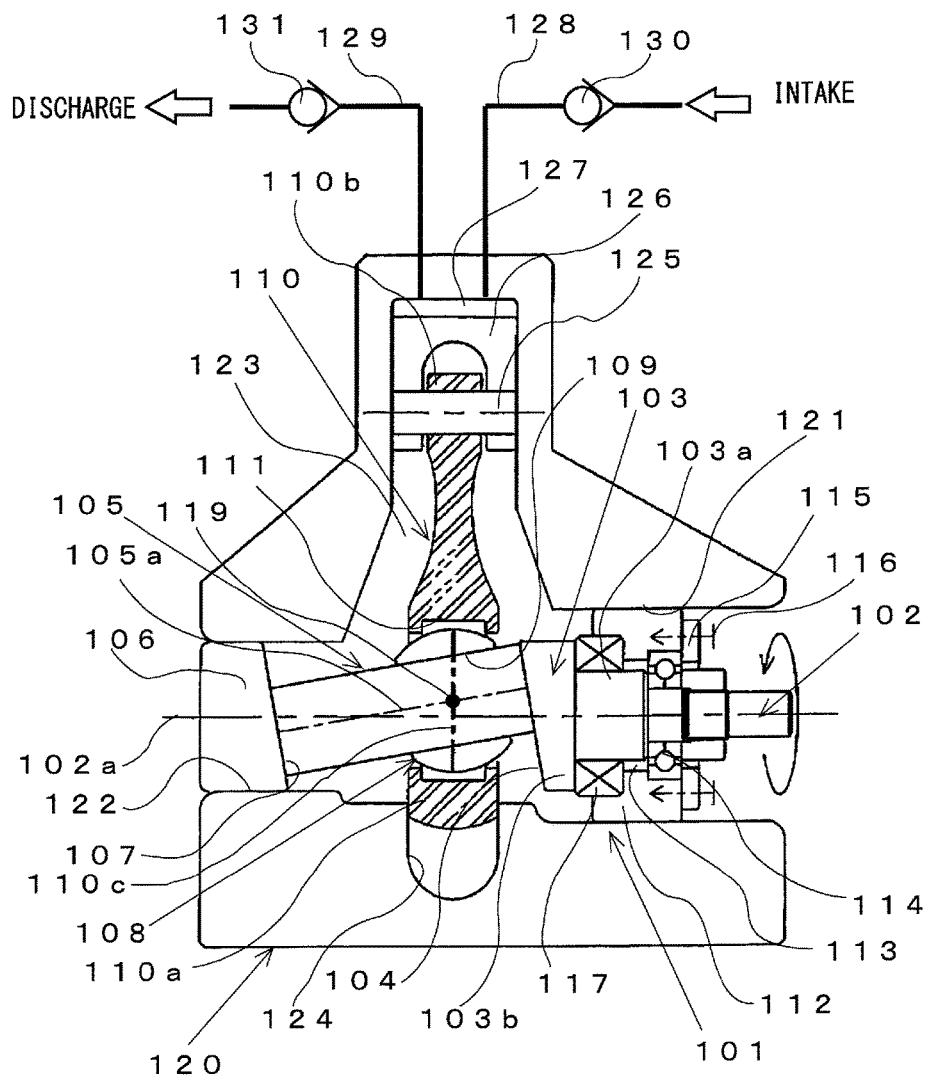
FIG. 20 is a sectional view illustrating a state in which a piston of the pumping apparatus of a variable discharge quantity according to the fourth embodiment of the present invention is raised to a peak position.
Figure 21:
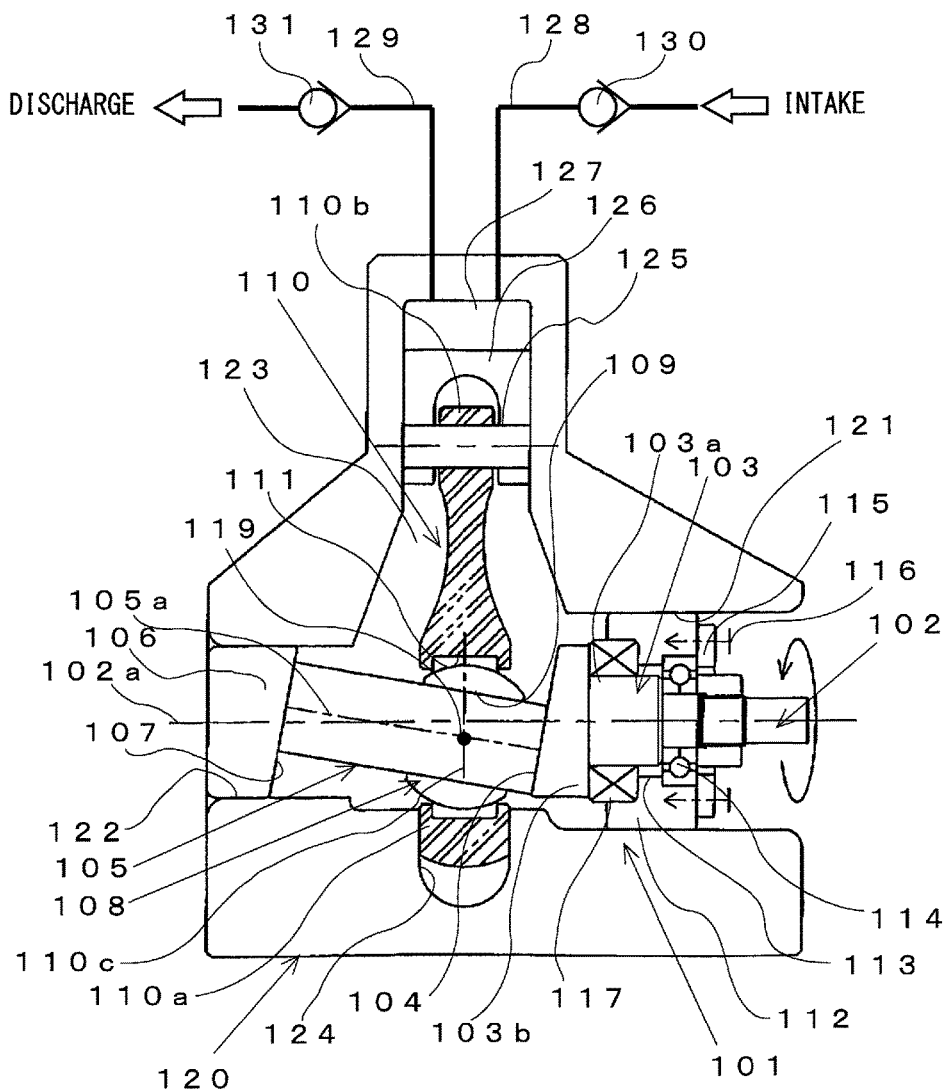
FIG. 21 is a sectional view illustrating a state in which the piston of the pumping apparatus of a variable discharge quantity according to the fourth embodiment of the present invention is lowered to a bottom position.
Figure 22:
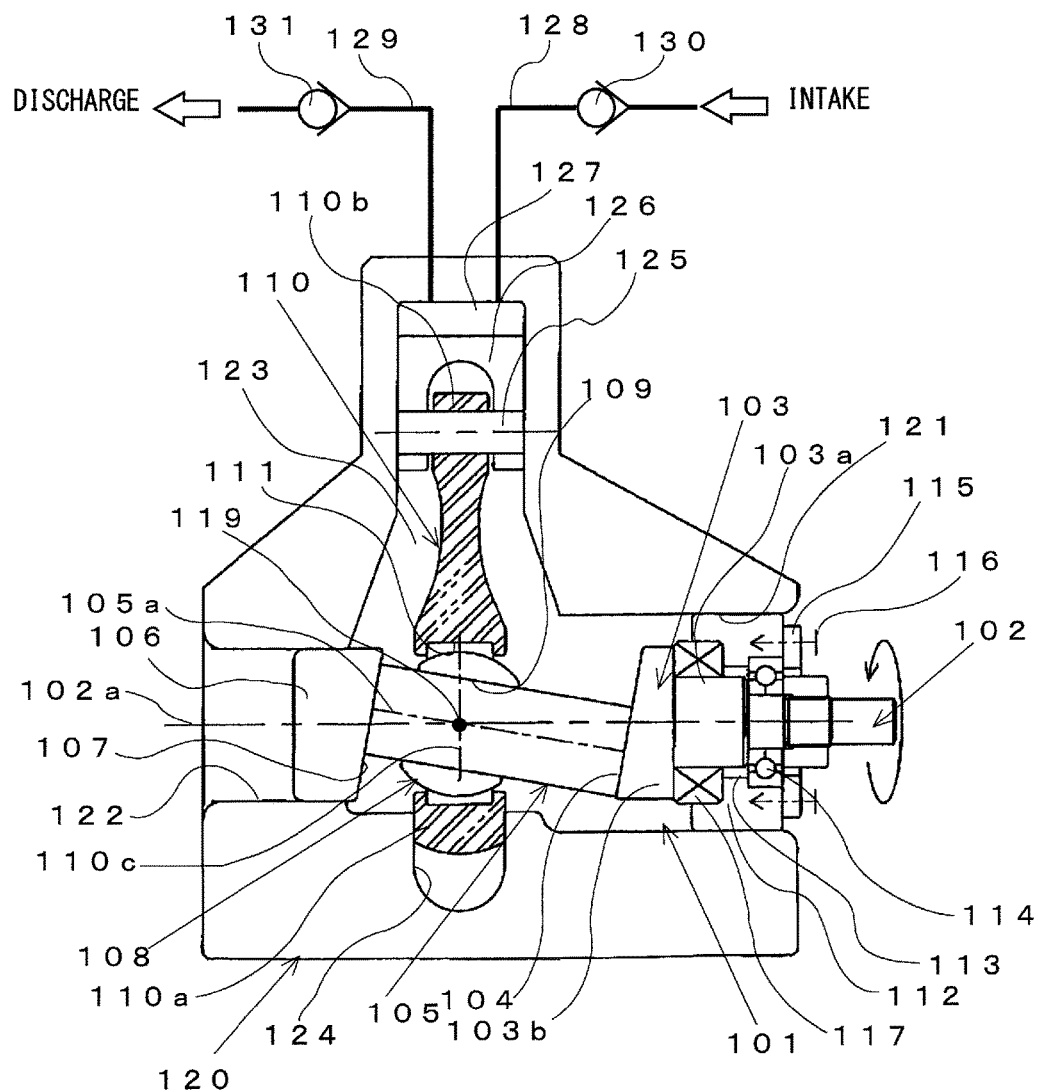
FIG. 22 is a sectional view illustrating a state in which the piston of the pumping apparatus of a variable discharge quantity according to the fourth embodiment of the present invention is moved to a stop position.

In addition, FIG. 19 corresponds to a sectional view illustrating the pumping apparatus of a variable discharge quantity 100 according to the third embodiment of the present invention illustrated in FIG. 15. FIG. 20 corresponds to a sectional view illustrating a state where the piston 126 of the pumping apparatus of a variable discharge quantity 100 according to the third embodiment of the present invention illustrated in FIG. 16 is raised to the peak position. FIG. 21 corresponds to a sectional view illustrating a state where the piston 126 of the pumping apparatus of a variable discharge quantity 100 according to the third embodiment of the present invention illustrated in FIG. 17 is lowered to the bottom position. FIG. 22 corresponds to a sectional view illustrating a state where the piston 126 of the pumping apparatus of a variable discharge quantity 100 according to the third embodiment of the present invention illustrated in FIG. 18 is moved to the stop position.

Since the pumping apparatus of a variable discharge quantity 100A according to the embodiment has substantially the same configuration as that of the pumping apparatus of a variable discharge quantity 100 according to the third embodiment of the present invention, the action thereof is substantially the same as that of the pumping apparatus of a variable discharge quantity 100 according to the third embodiment of the present invention.

Fifth Embodiment

Figure 23:
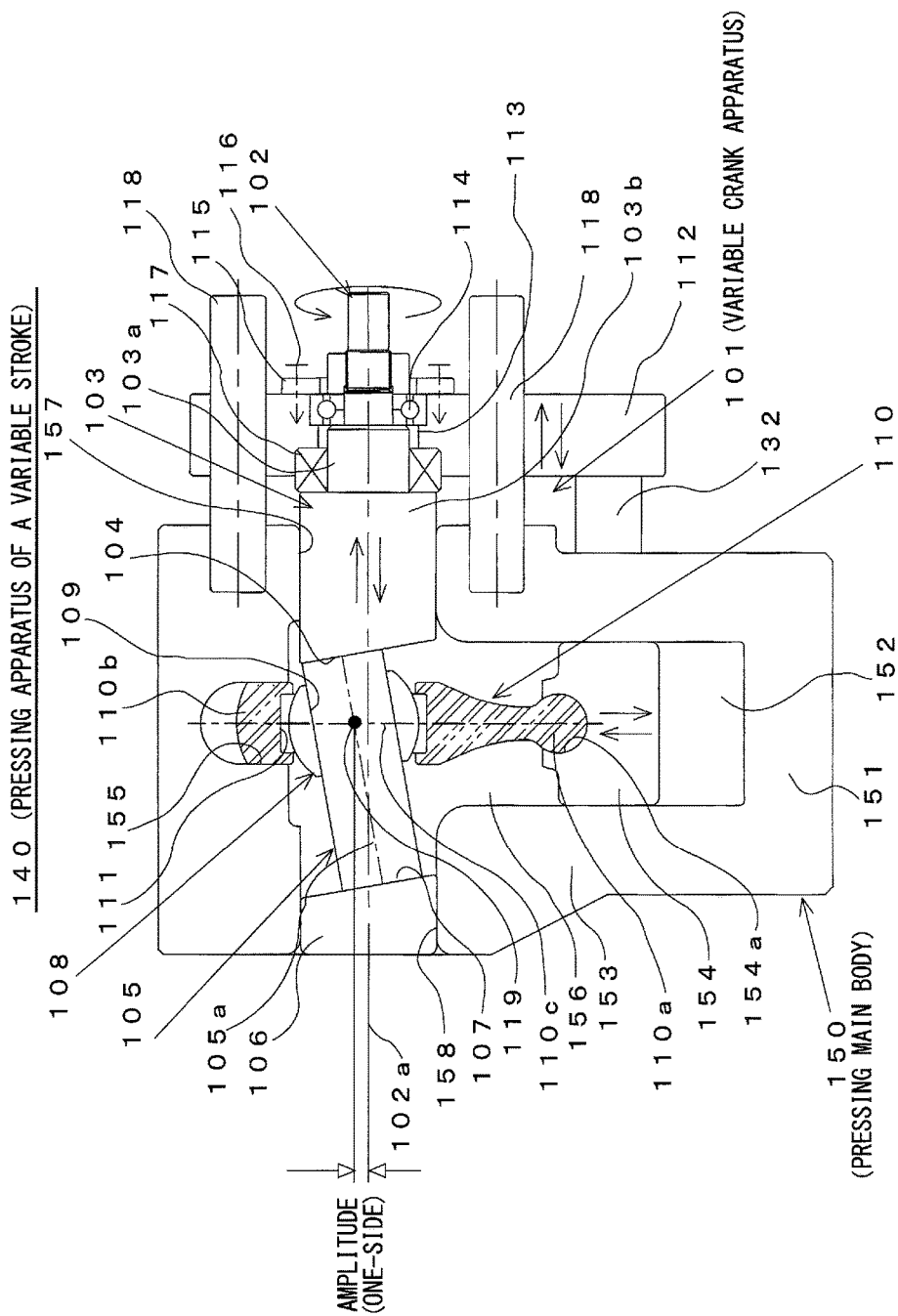
FIG. 23 is a sectional view illustrating a state in which a connection rod of a pressing apparatus of a variable stroke according to a fifth embodiment of the present invention reaches a top dead center.
Figure 24:
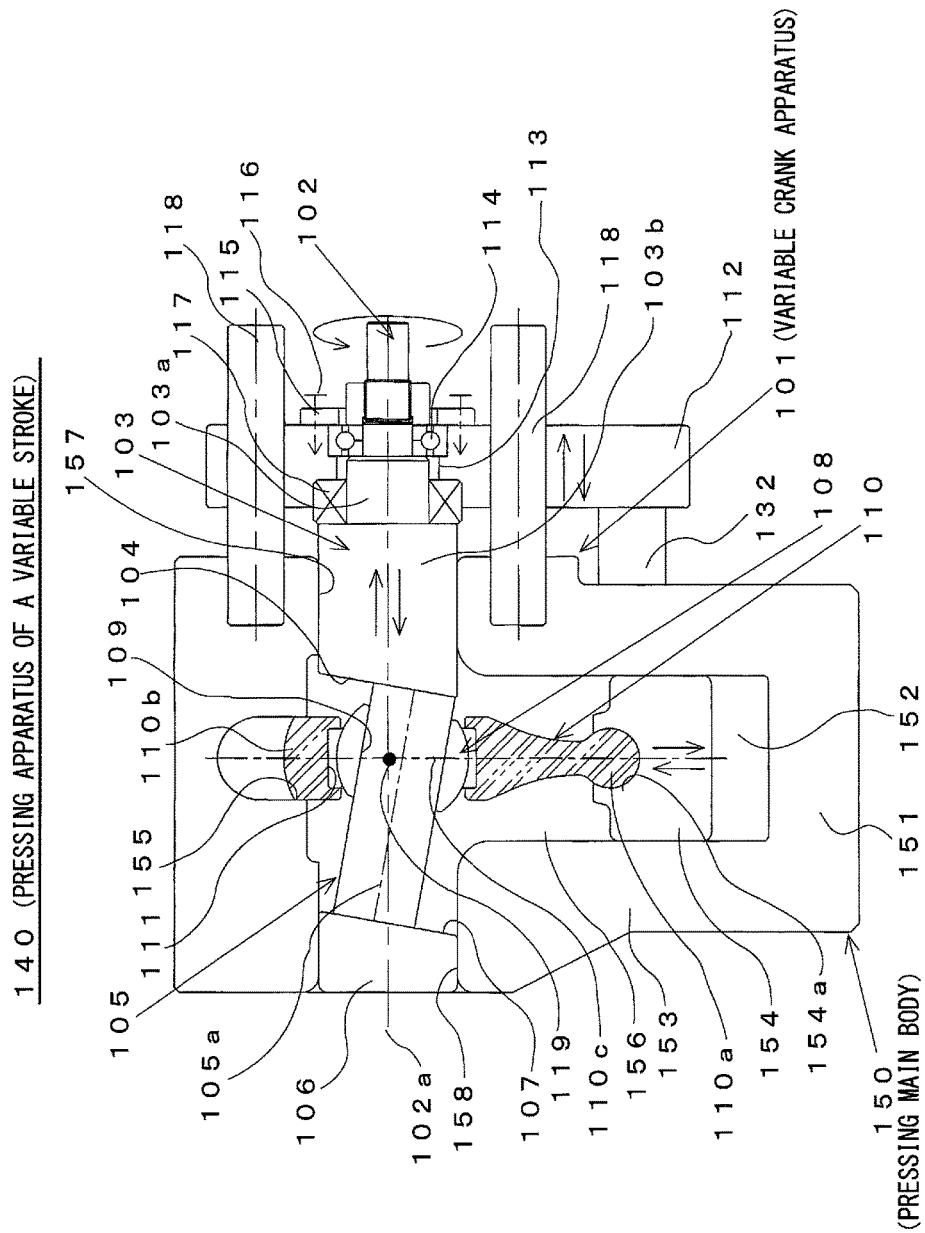
FIG. 24 is a sectional view illustrating a state in which the connection rod of the pressing apparatus of a variable stroke according to the fifth embodiment of the present invention reaches a bottom dead center.

FIGS. 23 and 24 illustrate a pressing apparatus of a variable stroke 140 according to a fifth embodiment of the present invention.

The pressing apparatus of a variable stroke 140 according to the embodiment includes the variable crank apparatus 101 according to the present invention and a pressing main body 150. Since the variable crank apparatus 101 according to the present invention has substantially the same basic configuration as that of the variable crank apparatus 101 which is used in the pumping apparatus of a variable discharge quantity 100 according to the third embodiment illustrated in FIGS. 15 to 18, and in the pumping apparatus of a variable discharge quantity 100A according to the fourth embodiment illustrated in FIGS. 19 to 22, the same configuration elements are given the same reference numerals.

The variable crank apparatus 101 includes the main axis 102 which is linked to the linking body 103. The main axis 102 is held to be freely rotatable by the crank axial base 112, and is rotated by the driving force of the motor or the flywheel. The main axis 102 is inserted into the through hole 113 of the crank axial base 112, and is held to be freely rotatable by the bearing apparatus 114. The outer circumference of the bearing apparatus 114 is fixed to the crank axial base 112 via the thread 116, via the attachment frame 115.

In the linking body 103, for example, the upper surface of the main body 103a which is configured of a columnar body is the columnar body 103b which has the outer diameter that is greater than that of the main body 103a, and the inclined surface 104 is formed on the tip end surface of the columnar body 103b. The linking body 103 interposes the bearing apparatus 117 in the step portion which makes the boundary between the main body 103a and the columnar body 103b, and is mounted to be freely rotatable on the crank axial base 112.

The inclined crankpin (action axis) 105 which is inclined with respect to the center line 102a of the main axis 102 is assembled to the inclined surface 104 of the linking body 103. The inclined crankpin (action axis) 105 is inserted into the through hole 109 of the spherical bearing 108 assembled to the through hole 111, and is assembled to the connection rod 110. The tip end portion of the inclined crankpin (action axis) 105 is linked to the crank axis 106 via the inclined surface 107. The inclined surface 107 of the crank axis 106 is inclined by the same angle as that of the inclined surface 104 of the linking body 103.

The crank axial base 112 is supported via the plurality of guide posts 118. The plurality of guide posts 118 are assembled to the pressing main body 150. The crank axial base 112 is moved by a moving apparatus 132. The moving apparatus 132 is disposed between the crank axial base 112 and the pressing main body 150.

In addition, the moving apparatus 132 includes the driving power source, such as an engine, a motor, or a flywheel, which rotates the main axis 102, the position adjusting portion which moves the crank axial base 112, and the control apparatus (for example, the control apparatus 60 in the embodiments illustrated in FIGS. 1, 2, and 4 corresponds thereto). The position adjusting portion which moves the crank axial base 112 is not particularly limited if the portion has a mechanism and a structure which make the crank axial base 112 approach/separate from the pressing main body 150, similar to an oil pressure pump or an actuator.

In the pressing main body 150 in which the variable crank apparatus 101 according to the present invention is employed, a side column 153 provided with a mold area 152 is assembled to a bolster 151 (*bed*), and a slide 154 assembled to the connection rod 110 is disposed to be vertically movable in the mold area 152. The tip end portion 110*a* of the connection rod 110 is fitted into a recessed portion 154*a* of the slide 154. In addition, the rear end portion 110*b* of the connection rod 110 is disposed to be slidable when vertically moving in a sliding hole 155.

In addition, the pressing main body 150 includes a space 156 in which the connection rod 110 vertically moves, a through hole 157 into which the linking body 103 is inserted to be freely slidable and rotatable, and a through hole 158 into which the crank axis 106 is inserted to be freely slidable and rotatable.

Next, an action of the pressing apparatus of a variable stroke 140 according to the embodiment will be described.

In the pressing apparatus of a variable stroke 140 according to the embodiment, in a state where the main axis 102 does not rotate the crank axial base 112, for example, when the crank axial base 112 is moved in the leftward-and-rightward direction in the drawing in a state of FIG. 23, the position of the action point 119 at which the center line 105*a* of the inclined crankpin 105 and the center line 110*c* of the connection rod 110 are engaged with each other, is changed. Accordingly, even in a state where the main axis 102 does not rotate the crank axial base 112, when the crank axial base 112 is moved in the leftward-and-rightward direction in the drawing, the position of the action point 119 moves in the vertical direction in the drawing along the inclination of the inclined crankpin 105. At this time, for example, as illustrated in FIG. 23, the slide 154 assembled to the connection rod 110 also moves in the vertical direction only by the movement of the action point 119. In FIG. 23, the movement amount is illustrated as the amplitude (one side).

In a state where the position of the action point 119 and the center line 102*a* of the main axis 102 are shifted, when rotating the main axis 102, for example, as illustrated in FIG. 23, the slide 154 assembled to the eccentric connection rod 110 reciprocates in the vertical direction in the drawing. The size of the stroke of the slide 154 increases as the shift between the position of the action point 119 and the center line 102*a* of the main axis 102 increases.

According to the pressing apparatus of a variable stroke 140 according to the embodiment, for example, from the state illustrated in FIG. 23 to the state illustrated in FIG. 24, when rotating the main axis 102 in the rotational direction illustrated by an arrow, the connection rod 110 acts to compress a workpiece (not illustrated) disposed in the mold area 152 by the slide 154 while the connection rod 110 is lowered toward the bolster (bed) 151.

At this time, the inclined crankpin (action axis) 105 into which the spherical bearing 108 of the connection rod 110 is inserted according to the movement of the moving apparatus 132, changes the distance (illustrated as the amplitude (one side) in FIG. 23) between the center line 102*a* of the main axis 102 and the action point 119 by changing the position of the action point 119 at which the inclined crankpin (action axis) 105 and the center line 110*c* of the connection rod 110 are engaged with each other in the through hole 109 of the spherical bearing 108 while changing the stroke linearly, similar to the action of the inclined crankpin 36 in the first embodiment illustrated in FIGS. 6 and 7.

In addition, as illustrated in FIG. 24, when the connection rod 110 reaches the bottom dead center, the slide 154 is raised in a reverse direction, and moves in a direction of being separated from the workpiece (not illustrated).

By repeating this operation, it is possible to perform predetermined processing with respect to the workpiece (not illustrated) disposed in the mold area 152.

In addition, when the main axis 102 is rotated in the rotational direction illustrated by the arrow, and the main axis 102 is operated to be separated from the pressing main body 150 by the moving apparatus 132, in a state different from the description above, it is possible to perform the predetermined processing with respect to the workpiece (not illustrated) disposed in the mold area 152.

The operations are arbitrarily selected in accordance with the purpose of the processing with respect to the workpiece (not illustrated) disposed in the mold area 152.

Sixth Embodiment

Figure 25:
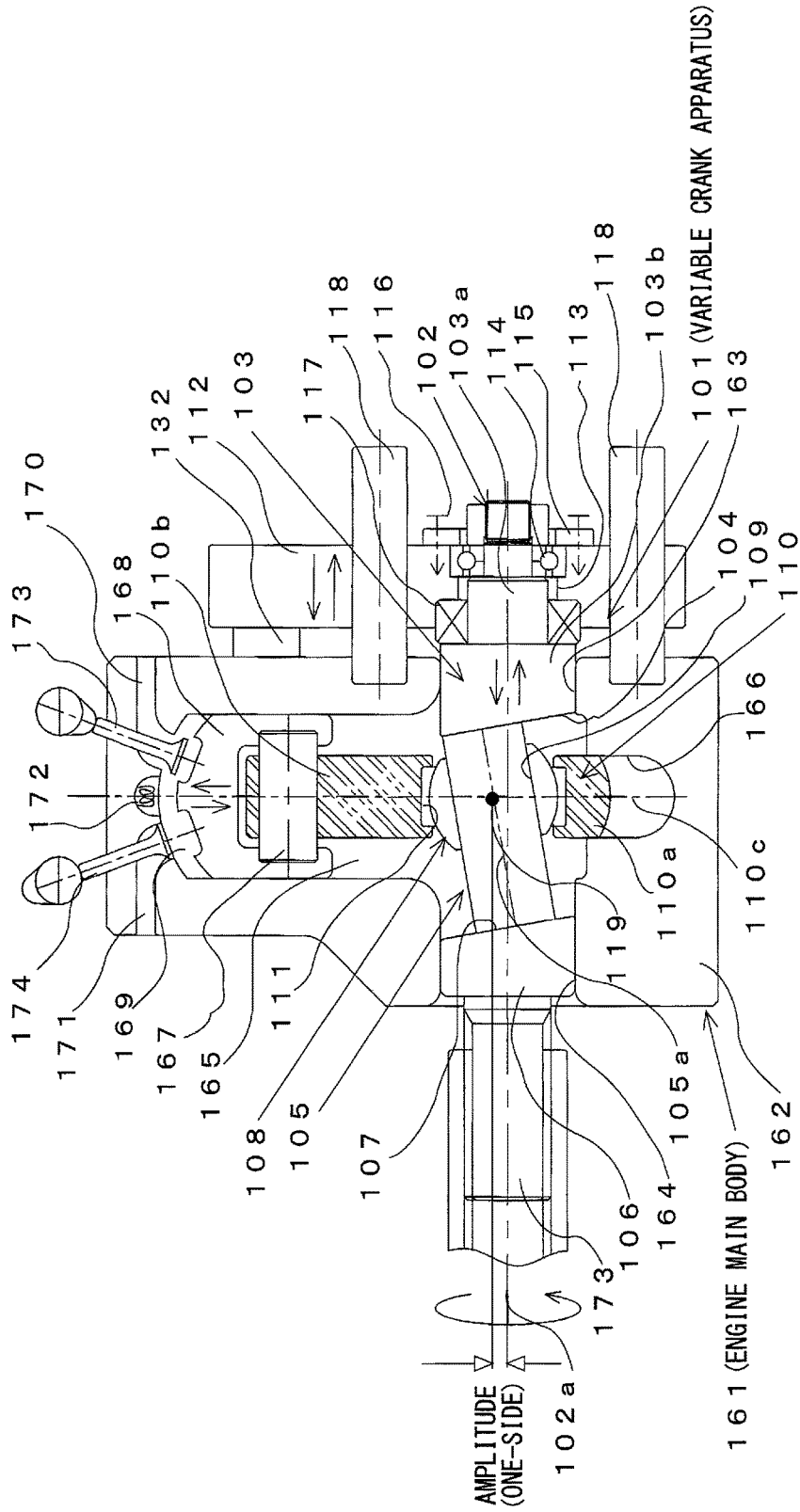
FIG. 25 is a sectional view illustrating a variable stroke engine according to a sixth embodiment of the present invention.

FIG. 25 illustrates a variable stroke engine 160 according to a sixth embodiment of the present invention.

The variable stroke engine 160 according to the embodiment includes the variable crank apparatus 101 according to the present invention, an engine main body 161, and an output shaft 173. Since the variable crank apparatus 101 according to the present invention has substantially the same basic configurations as those of the pumping apparatus of a variable discharge quantity 100 of the third embodiment illustrated in FIGS. 15 to 18, the pumping apparatus of a variable discharge quantity 100A of the fourth embodiment illustrated in FIGS. 19 to 22, and the variable crank apparatus 101 which is used in the pressing apparatus of a variable stroke 140 of the fifth embodiment illustrated in FIGS. 23 and 24, the same configuration elements are given the same reference numerals.

The variable crank apparatus 101 includes the main axis 102 which is linked to the linking body 103. The main axis 102 is held to be freely rotatable by the crank axial base 112, and is rotated by the driving force of the motor or the flywheel. The main axis 102 is inserted into the through hole 113 of the crank axial base 112, and is held to be freely rotatable by the bearing apparatus 114. The outer circumference of the bearing apparatus 114 is fixed to the crank axial base 112 via the thread 116, via the attachment frame 115.

In the linking body 103, for example, the upper surface of the main body 103*a* which is configured of a columnar body is the columnar body 103*b* which has the outer diameter that is greater than that of the main body 103*a*, and the inclined surface 104 is formed on the tip end surface of the columnar body 103*b*. The linking body 103 interposes the bearing apparatus 117 in the step portion which makes the boundary between the main body 103*a* and the columnar body 103*b*, and is mounted to be freely rotatable on the crank axial base 112.

The inclined crankpin (action axis) 105 which is inclined with respect to the center line 102*a* of the main axis 102 is assembled to the inclined surface 104 of the linking body 103. The inclined crankpin (action axis) 105 is inserted into the through hole 109 of the spherical bearing 108 assembled to the through hole 111, and is assembled to the connection rod 110. The tip end portion of the inclined crankpin (action axis) 105 is linked to the crank axis 106 via the inclined surface 107. The inclined surface 107 of the crank axis 106 is inclined by the same angle as that of the inclined surface 104 of the linking body 103.

The crank axial base 112 is supported via the plurality of guide posts 118. The plurality of guide posts 118 are assembled to the engine main body 161. The crank axial base 112 is moved by the moving apparatus 132. The moving apparatus 132 is disposed between the crank axial base 112 and the engine main body 161.

In addition, the moving apparatus 132 includes the driving power source, such as an engine, a motor, or a flywheel, which rotates the main axis 102, the position adjusting portion which moves the crank axial base 112, and the control apparatus (for example, the control apparatus 60 in the embodiments illustrated in FIGS. 1, 2, and 4 corresponds thereto). The position adjusting portion which moves the crank axial base 112 is not particularly limited if the portion has a mechanism and a structure which make the crank axial base 112 approach/separate from the engine main body 161, similar to an oil pressure pump or an actuator.

The engine main body 161 includes a cylinder block 162 to which the variable crank apparatus 101 is assembled. The cylinder block 162 includes a through hole 163 which disposes the linking body 103 of the variable crank apparatus 101 to be freely rotatable and slidable, and a through hole 164 which disposes the crank axis 106 of the variable crank apparatus 101 to be freely rotatable and slidable.

In addition, the cylinder block 162 includes a space 165 in which the connection rod 110 of the variable crank apparatus 101 vertically moves. Below the space 165, a recessed portion 166 which guides the lower end portion 110a of the connection rod 110 of the variable crank apparatus 101 to be freely slidable is provided.

Meanwhile, above the space 165, a piston 168 which is assembled to the upper end portion 110b of the connection rod 110 of the variable crank apparatus 101 via a piston pin 167 is provided. Above the piston 168, a compression chamber 169 which guides the piston 168 to be freely slidable is formed. A port 170 which supplies gasified fuel, and a port 171 which discharges combusted gas, communicate with the compression chamber 169. In the ports 170 and 171, valves 172 and 173 for opening and closing are respectively provided. In addition, a spark plug 172 is provided in the compression chamber 169.

The output shaft 173 which is linked to the crank axis 106 of the variable crank apparatus 101 is linked to the engine main body 161. A transmission which is not illustrated is spline-coupled to the output shaft 173.

Next, an action of the variable stroke engine 160 according to the embodiment will be described.

In the variable stroke engine 160 according to the embodiment, in a state where the main axis 102 does not rotate the crank axial base 112, for example, when the crank axial base 112 is moved in the leftward-and-rightward direction in the drawing in a state of FIG. 25, the position of the action point 119 at which the center line 105a of the inclined crankpin 105 and the center line 110c of the connection rod 110 are engaged with each other, is changed. Accordingly, even in a state where the main axis 102 does not rotate, when the crank axial base 112 is moved in the leftward-and-rightward direction in the drawing, the position of the action point 119 moves in the vertical direction in the drawing along the inclination of the inclined crankpin 105. At this time, for example, as illustrated in FIG. 25, the piston 168 assembled to the connection rod 110 also moves in the vertical direction only by the movement of the action point 119. In FIG. 25, the movement amount is illustrated as the amplitude (one side).

In a state where the position of the action point 119 and the center line 102a of the main axis 102 are shifted, when rotating the main axis 102, for example, as illustrated in FIG. 25, the piston 168 assembled to the eccentric connection rod 110 reciprocates in the vertical direction in the drawing. The size of the stroke of the piston 168 increases as the shift between the position of the action point 119 and the center line 102a of the main axis 102 increases.

According to the variable stroke engine 160 according to the embodiment, for example, in a state illustrated in FIG. 25, when rotating the main axis 102 in the rotational direction illustrated by an arrow, the connection rod 110 moves the piston 168 toward the compression chamber 169 via the piston pin 167, and compresses a gas mixture in the compression chamber 169. In addition, from the viewpoint that the pressure in the compression chamber 169 reaches a predetermined value, the spark plug 172 is ignited, and the piston 168 is pressed down by combustion pressure. By using this force, it is possible to rotate the output shaft 173.

At this time, the inclined crankpin (action axis) 105 into which the spherical bearing 108 of the connection rod 110 is inserted according to the movement of the crank axial base 112 by the moving apparatus 132 controlled by the control apparatus (not illustrated), changes the distance (illustrated as the amplitude (one side) in FIG. 25) between the center line 102a of the main axis 102 and the action point 119 by changing the position of the action point 119 at which the inclined crankpin (action axis) 105 and the center line 110c of the connection rod 110 are engaged with each other in the through hole 109 of the spherical bearing 108 while changing the stroke linearly, similar to the action of the action axis 36 in the first embodiment illustrated in FIGS. 6 and 7.

By repeating this operation, the variable stroke engine 160 according to the embodiment can supply a predetermined rotational force to the output shaft 173.

In addition, in the above-described embodiments, a case where the variable crank apparatus 101 is employed in the pumping apparatuses of a variable discharge quantity 100 and 100A, the pressing apparatus of a variable stroke 140, and the variable stroke engine 160, is described, but the present invention is not limited thereto, and for example, the variable crank apparatus 101 may be employed in a hydraulic pump, a variable compressor, a stirling engine, a stirring machine, or an excitation machine.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to exact construction and operation illustrated and described, and accordingly all suitable modifications and equivalents may be resorted to, falling within the scope thereof.

The invention claimed is:

1. An R-θ table apparatus comprising:
   a table which is provided with at least one through hole having a bearing;
   a guide member which holds the table to be horizontally freely movable;
   a driving apparatus which is provided with at least one action axis obliquely inserted into the bearing, and drives the action axis to be freely rotated and stopped;
   an elevating base which elevates the driving apparatus;

an elevating apparatus which elevates the elevating base, and changes a position of an action point at which the action axis and the bearing are engaged with each other; and a base which is provided with a post that guides the elevating base and the guide member, and mounts the elevating apparatus, wherein a horizontal distance between a center line of a main axis of the driving apparatus and the action point is changed by elevating the elevating base, and the table is moved to an arbitrary position without rotating along the guide member.

2. The R-θ table apparatus according to claim 1, wherein the at least one through hole comprises a plurality of through holes, and the table is provided with the plurality of through holes, wherein the at least one action axis comprises a plurality of action axes, and each of the action axes is inserted into each through hole of the plurality of through holes, and wherein each of the action axes is synchronously operated.

3. The R-θ table apparatus according to claim 1,
wherein the bearing is a spherical bearing.

4. The R-θ table apparatus according to claim 1,
wherein the driving apparatus and the elevating apparatus are a servo motor or a stepping motor.

5. A processing apparatus of an internal thread comprising:

the R-θ table apparatus according to claim 1;

an external thread shaped tool which is fixed and loaded onto the table; and a support member which is fixed onto the base, and grips or fixes a metal material having a hole for internal thread processing, wherein while the external thread shaped tool fixed onto the table consecutively presses a processing portion of the external thread shaped tool to an inner circumference of the hole with only a revolving motion on a constant horizontal surface without rotating, a thread groove is formed by transferring a shape of the processing portion.

\* \* \* \* \*